(12) United States Patent
Ohta

(10) Patent No.: US 8,787,173 B2
(45) Date of Patent: *Jul. 22, 2014

(54) BASE STATION, MOBILE STATION, COMMUNICATION SYSTEM, AND REORDERING METHOD THEREOF

(75) Inventor: Yoshiaki Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,361

(22) Filed: May 4, 2012

(65) Prior Publication Data

US 2012/0218972 A1 Aug. 30, 2012

Related U.S. Application Data

(63) Continuation of application No. 12/556,876, filed on Sep. 10, 2009, now Pat. No. 8,687,496, which is a continuation of application No. PCT/JP2007/055800, filed on Mar. 22, 2007.

(51) Int. Cl.
*H04W 36/02* (2009.01)
*H04W 36/00* (2009.01)

(52) U.S. Cl.
CPC .............. *H04W 36/02* (2013.01); *H04W 36/00* (2013.01)
USPC ......................................................... 370/236

(58) Field of Classification Search
USPC ......................................................... 370/331
See application file for complete search history.

(56) References Cited

U.S. PATENT DOCUMENTS

| | | | |
|---|---|---|---|
| 5,896,373 A | 4/1999 | Mitts et al. | |
| 5,940,371 A | 8/1999 | Mitts et al. | |
| 7,433,337 B2 | 10/2008 | Chao et al. | |
| 2002/0145991 A1 | 10/2002 | Miya et al. | |
| 2007/0041382 A1 | 2/2007 | Vayanos et al. | |

(Continued)

FOREIGN PATENT DOCUMENTS

| EP | 1 209 856 | 5/2002 |
|---|---|---|
| JP | 09-186704 | 7/1997 |

(Continued)

OTHER PUBLICATIONS

Translated Document for application JP-2003-111134A, Apr. 11, 2003, Paragraph 0038-0063.*

(Continued)

*Primary Examiner* — Mark Rinehart
*Assistant Examiner* — Maharishi Khirodhar
(74) *Attorney, Agent, or Firm* — Myers Wolin, LLC

(57) ABSTRACT

A communication system wherein a base station sends packets having sequence numbers attached, to a mobile station, the mobile station rearranges the packets by sequence number, and hard handover is performed. A handover source base station having a controller decides whether the handover source base station forwards packets which were not sent to the mobile station, out of packets received from a host station, to a handover target base station, controls forwarding of the packets to the handover target base station and sends forwarding execution information from the handover source base station to the mobile station to notify whether the forwarding of the packets has been executed, the mobile station including a receiver that receives the forwarding execution information from the handover source base station; and a controller that executes reordering of the received packets based on the forwarding execution information at the handover.

11 Claims, 25 Drawing Sheets

(56) References Cited

U.S. PATENT DOCUMENTS

| | | | |
|---|---|---|---|
| 2007/0047493 A1 | 3/2007 | Park et al. | |
| 2008/0254800 A1 | 10/2008 | Chun et al. | |
| 2009/0185535 A1 | 7/2009 | Lee et al. | |

FOREIGN PATENT DOCUMENTS

| | | | |
|---|---|---|---|
| JP | 11-313358 | | 11/1999 |
| JP | 2002-026919 | | 1/2002 |
| JP | 2003-111134 | | 4/2003 |
| JP | 2003111134 A | * | 4/2003 |
| JP | 2003-153327 | | 5/2003 |
| JP | 2003153327 A | * | 5/2003 |
| JP | 2004-135076 | | 4/2004 |
| JP | 2004-282652 | | 10/2004 |

OTHER PUBLICATIONS

3GPP TSG RAN WG2 Meeting #54, Aug. 28-Sep. 1, 2006, Estonia, UE PDCP reordering at inner eNB handover, pp. 1-5.*

Translated Document for application J P2003-153327A, May 23, 2003, paragraphs 0144-0145.*

Third Notification of Office Action issued for corresponding Chinese Patent Application No. 200780052045.1, issued Feb. 1, 2013 with English translation.

Japanese Patent Office "Notification of Reason for Refusal", issued for corresponding Japanese Patent Application No. 2009-506059, dispatched Apr. 12, 2011. English translation attached.

Supplementary European Search Report for corresponding EP patent application No. 07739243.9, dated Mar. 16, 2011.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard; 3GPP TS 36.300, 3rd Generation Partnership Project (3GPP), No. V0.5.0, Feb. 1, 2007, pp. 1-73.

ASUSTeK:"Reordering function in LTE"3GPP Draft; R2-070761 LTE Reordering 3rd Generation Partnership Project (3GPP), vol. RAN WG2 #57, St. Louis, USA; Feb. 12-16, 2007.

Ericsson, NTT DoCoMo, Panasonic, Motorola, Siemens, "DL reordering and forwarding", 3GPP Draft; R2-070250, 3rd Generation Partnership Project, vol. RAN WG2 #56bis, Sorrento, Italy, Jan. 15-19, 2007.

International Search Report for corresponding International Application No. PCT/JP2007/055800, with a mailing date of Jun. 19, 2007.

3GPP TR 25.913 V7.3.0 (Mar. 2006); 3rd Generation Partnership Project; Technical Specification Group Radio Access Network; "Requirements for Evolved UTRA (E-UTRA) and Evolved UTRAN (E-UTRAN)"; (Release 7); Dated Mar. 2006.

3GPP TS 36.300 V8.0.0 (Mar. 2007); 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2 (Release 8); Dated Mar. 2007.

Samsung; "Method to release resources at source ENB during handover"; 3GPP TSG-RAN WG3 #53 meeting, Tallinn, Estonia, Aug. 28-Sep. 1, 2006; R3-061032.

Non-Final Office Action issued by the United States Patent & Trademark Office for corresponding U.S. Appl. No. 12/556,876, issued May 5, 2011.

Non-Final Office Action issued by the United States Patent & Trademark Office for corresponding U.S. Appl. No. 12/556,876, issued Nov. 9, 2011.

Official Office Action issued by the United States Patent and Trademark Office for corresponding U.S. Appl. No. 12/556,876 electronically delivered on Jul. 5, 2012.

Motorola; "Reordering of downlink RLC SDUs during handovers"; Agenda Item: 14; R2-062894; 3GPP TSG-RAN-WG2 Meeting #55; Seoul, Korea; Oct. 9-13, 2006.

Office Action issued for corresponding Russian Patent Application No. 2011115823 dated Aug. 13, 2012 with English translation.

Final Office Action issued by the United States Patent and Trademark Office for corresponding U.S. Appl. No. 12/556,876, dated Jan. 10, 2013.

Notification of Reasons for Refusal issued for corresponding Japanese Patent Application No. 2011-131373, dispatched Feb. 5, 2013 with English translation.

NTT DoCoMo, Inc.; "UE PDCP reordering at inter eNB handover"; Agenda Item: 11.9.2 Radio mobility procedures intra-LTE; Aug. 28-Sep. 1, 2006; pp. 1-5; R2-062170; 3GPP TSG RAN WG2 Meeting #54; Tallinn, Estonia.

Non-Final Office Action issued by the United States Patent and Trademark Office for corresponding U.S. Appl. No. 13/442,516, electronically delivered on Apr. 8, 2013.

Examination Report issued for corresponding Canadian Patent Application No. 2681127 dated Oct. 30, 2013.

Non-Final Office Action issued by the United States Patent and Trademark Office for corresponding U.S. Appl. No. 12/556,876, electronically delivered on May 22, 2013.

Examination report issued for corresponding European Patent Application No. 07 739 243.9 dated Jun. 24, 2013.

Examination report issued for corresponding European Patent Application No. 12 163 983.5 dated Jun. 24, 2013.

Non-Final Office Action issued by the United States Patent and Trademark Office for corresponding U.S. Appl. No. 13/442,516, electronically delivered on Aug. 19, 2013.

Examination report issued for corresponding European Patent Application No. 12 163 984.3 dated Jun. 21, 2013.

\* cited by examiner

FIG. 16
(A)
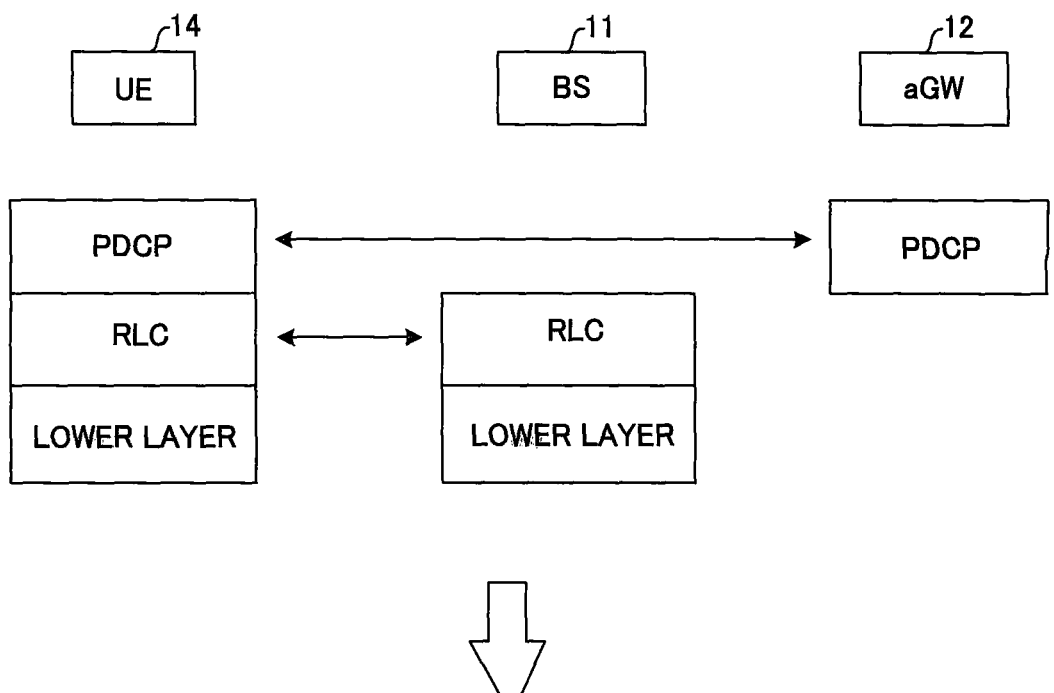
(B)
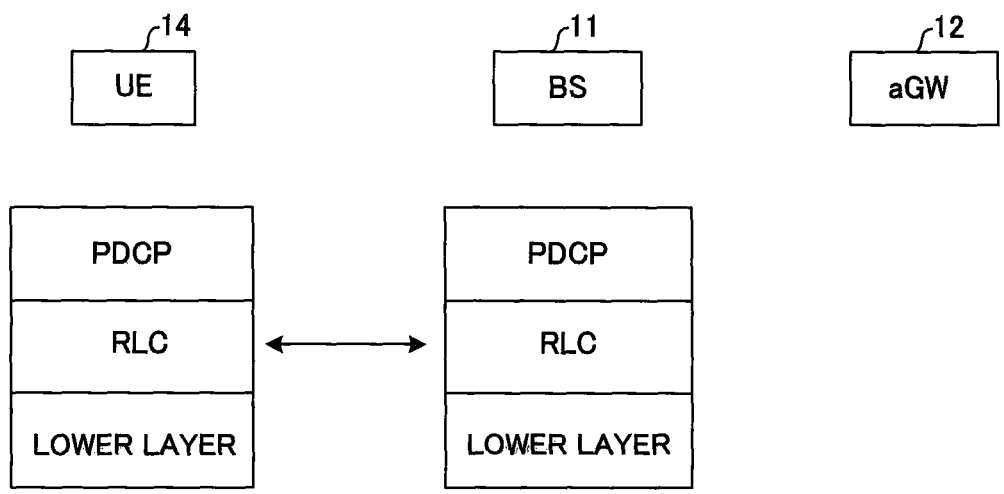

FIG. 19 PRIOR ART
(A)
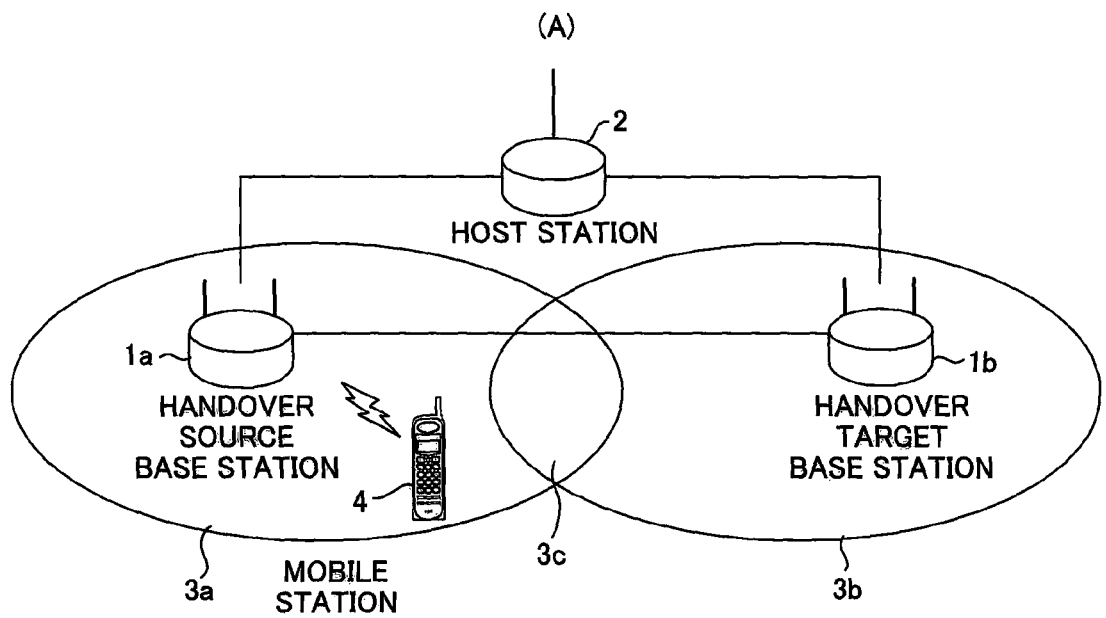
(B)
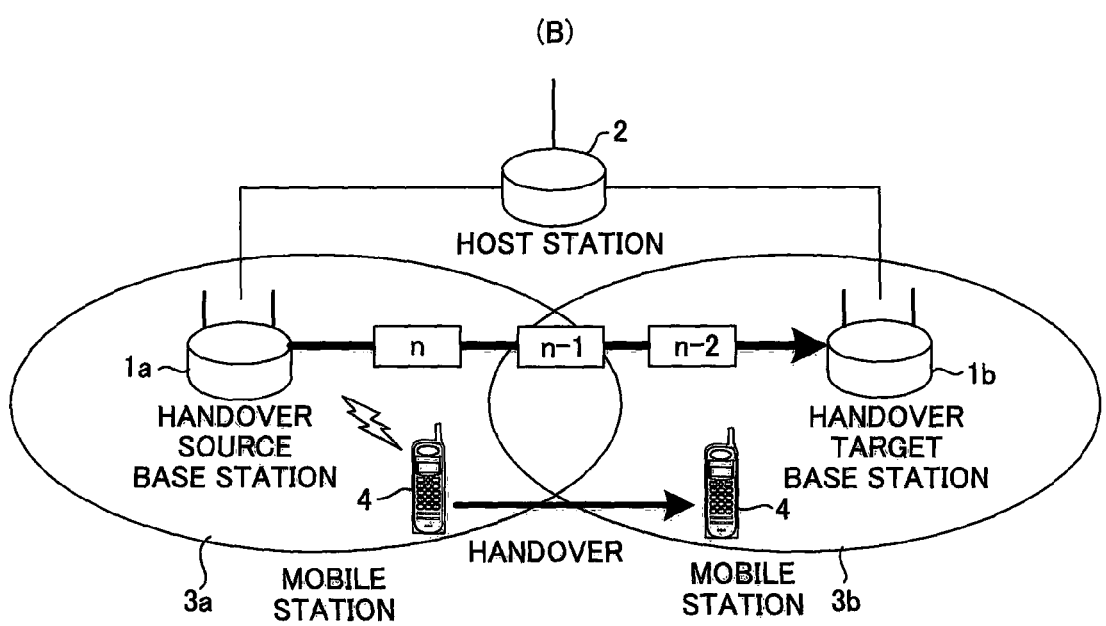

BASE STATION, MOBILE STATION, COMMUNICATION SYSTEM, AND REORDERING METHOD THEREOF

CROSS REFERENCE TO RELATED APPLICATION

The present application is a continuation of U.S. application Ser. No. 12/556,876, filed on Sep. 10, 2009, now pending, which is a continuation of International Application PCT/JP2007/055800, which was filed on Mar. 22, 2007, the contents of each are herein wholly incorporated by reference. This application also relates to U.S. application Ser. No. 13/442,516, filed on Apr. 9, 2012.

BACKGROUND OF THE INVENTION

The present invention relates to a base station, mobile station, communication system and reordering method thereof, and more particularly to a base station, mobile station, communication system and reordering method where packets, to which numbers indicating sequence are attached, are sent from a base station to a mobile station, and the packets are rearranged in order of the sequence number in the mobile station.

CDMA service based on the third generation method has begun in mobile communication systems, but a next generation mobile communication system (LTE: Long Term Evolution) which allows even faster communication is now under consideration at 3GPP (Third Generation Partnership Project) (see Non-patent Document 1). Here a decrease in transmission delay is a major issue, in addition to an increase in transmission rate.

In order to increase the transmission rate and decrease the transmission delay, an attempt to speed up the handover processing in comparison with the conventional systems, is being made in the LTE communication system. In the case of mobile communication, a base station that communicates with a mobile station is switched to another base station according to the receive state when the mobile station is moving during communication. This is referred to as handover and a base station in communication before handover is called a "handover source base station", and a base station to be in communication after handover is called a handover target base station. Therefore speeding up the handover is absolutely necessary to implement high-speed/low delay communication. In the LTE communication system, which is based on a packet exchange system, hard handover is used for the handover. In the case of hard handover, a line between a mobile station and a handover target base station is connected after a line between the mobile station and a handover source base station is disconnected. Hard handover can be performed quickly by obtaining system information of the handover target base station immediately before executing handover, but transmission of the user data is interrupted during handover.

This means that in order to decrease transmission delay, it is important to decrease the transmission interruption state and to prevent loss of packets during the transmission interruption state. If packets are dropped during the transmission interruption state, the dropped packets are recovered by end-to-end packet retransmission, so transmission delay increases.

Therefore in the handover of the LTE communication system, standardized is a method in which a handover source base station transfers at least packets, among the data including control information and packets addressed to the mobile station, to a handover target base station (see Non-patent Document 2). However, whether the data is actually transferred or not depends on whether this function is installed.

FIG. 19 is a diagram depicting packet transference during handover. In (A) of FIG. 19, two base stations 1a and 1b are connected to a host station (e.g. access gateway) 2. A mobile station 4 exists in a cell 3a of the base station 1a, and is currently communicating with the base station 1a. In this state, if the mobile station 4 moves toward the base station 1b and enters a cell 3b, as shown in (B) of FIG. 19, handover is executed, and the communication base station of the mobile station switches from base station 1a to base station 1b. A base station in communication before handover is called a "handover source base station" (source base station), and a base station to be in communication after handover is called a "handover target base station" (target base station).

The handover source base station 1a stores packets, received from the host station 2, in an internal buffer, and sequentially sends the packets stored in the buffer to the mobile station 4. Because of this, when handover occurs, some stored packets remain in the buffer without being sent to the mobile station. In (B) of FIG. 19, packets n-2 to n, which were received before handover and are not yet sent to the mobile station, exist in the buffer, and these packets must be sent from the handover target base station 1b to the mobile station 4 after handover. Therefore when the handover sequence is executed, the handover source base station 1a transfers (forwards) the packets n-2 to n to the handover target base station 1b (this is referred to as forwarding). By using this forwarding method, in which the handover target base station 1b sends these packets to the mobile station 4 immediately after handover, packet transmission is not interrupted. Hence end-to-end packet retransmission is not required, and high-speed handover can be executed. The above mentioned n-2 to n are numbers which indicate a sequence of packets (sequence number).

FIG. 20 is a diagram depicting a handover of an LTE communication system, and FIG. 21 is a diagram depicting a handover procedure which is currently assumed in the LTE communication system.

The mobile station (UE) 4 notifies the handover source base station 1a that handover HO is necessary, using the Measurement Report (1. Measurement control).

The handover source base station 1a decides a target base station 1b based on the content of the Measurement Report (2. HO decision), and sends the handover request to this handover target base station 1b (3. HO request). HO means handover. At this time, the handover source base station 1a also sends information on the mobile station (e.g. mobile station ID and QoS (Quality of Service) information to the handover target base station). The handover target base station 1b executes call acceptance control based on this information (4. Call acceptance control).

If the handover target base station 1b admits acceptance of the mobile station, it returns handover response to the handover source base station (5. HO response). Then, the handover source base station 1a instructs handover to the mobile station 4 (6. HO instruction), thereafter starts transfer of data (packets) before or after this step (packet transfer: forwarding).

The mobile station 4 which received the handover instruction insures synchronization with the handover target base station 1b by L1/L2 signaling (7. Synchronization insuring), and when the synchronization is insured, the mobile station 4 sends the handover completion report to the handover target base station 1b (8. HO completion).

Thereby the handover target base station 1b sends the handover completion report to the host station 2 (9. HO completion). The host station 2 which received the handover completion report switches the packet transmission path from the handover source base station 1a to the handover target base station 1b (10. Path switching), and returns the HO completion response to the handover target base station 1b (11. HO completion response). By the HO completion response, the handover target base station 1b notifies the handover source base station 1a that the handover HO is completed (12. Resource release). Then the path between the handover source base station 1a and the host station 2 is cleared (13. Resource release).

If packet transference (forwarding) is generated during the execution of the above mentioned handover sequence, the transferred packets may be jumped over by packets which flow into the handover target base station 1b from the host station 2, and the sequence numbers may be out of order. If the handover target base station 1b transfers the packets to the mobile station 4 without correcting the order, the mobile station cannot receive the packets in correct order, whereby communication quality deteriorates and high quality communication before and after the handover cannot be implemented as a result.

Therefore in the LTE communication system, the packet sequence consistency between the base station and the mobile station is maintained by the following method. FIG. 22 is a diagram depicting the packet sequence consistency, where the handover target base station 1b maintains packet sequence consistency by transmitting the packets transferred from the handover source base station 1a with priority over the packets received from the host station. In other words, packets n−5 to n have been stored in the handover source base station 1a before handover, and handover is then generated, so the packets n−5 to n−3 are transferred to the handover target base station 1b and stored in the buffer BF. In the buffer BF of the handover target base station 1b, packets n+1 and n+2, received from the host station, have also been stored.

The handover target base station 1b, which stores the transferred packets n−5 to n−3 and the packets n+1 to n+2 that flowed into in the buffer from the host station, sends the packets n−5 to n−3 transferred from the handover source base station 1a first to the mobile station. Then if a delay exists in the transfer of the packets n−2 to n from the handover source base station 1a, the handover target base station 1b sends the packets n+1 to n+2 to the mobile station. The mobile station 4 executes processing to rearrange the received packets in the order of sequence numbers (reordering).

FIG. 23 is a diagram depicting the reordering processing of the mobile station. In FIG. 22, the mobile station 4 received the packets n−5 to n−3 in the order of sequence numbers, so the packets are sequentially transferred to the upper layer. At the point of receiving the packets n+1 to n+2, however, packets n−2 to n have not yet arrived. Therefore the mobile station 4 stores the packets n+1 to n+2 in the buffer BF1 until receiving these packets n−2 to n which have not yet arrived, and does not transfer these packets n+1 to n+2 to the upper layer. When the packets n−2 to n are received, the mobile station 4 transfers these packets and packets n+1 to n+2 sequentially to the upper layer. An upper limit is normally set for the packet wait time, and is measured by a timer of the mobile station, for example.

As mentioned above, in the case of handover in the LTE communication system, the essential technologies are the packet transfer (packet forwarding) from the handover source base station to the handover target base station and the packet reordering processing at the mobile station. The relationship of these functions will now be described in detail.

FIG. 24 is a diagram depicting a protocol configuration between the mobile station and the network. Between the mobile station and the network, at least a PDCP (Packet Data Convergence Protocol) layer, RLC (Radio Link Control) layer and lower layer (MAC layer/physical layer MAC/PHY) are installed. These layers are all installed in the mobile station, but are not always installed in a station at the network side. In the case of the example in FIG. 25, the PDCP layer is installed in the host station aGW2, and the RLC layer and the lower layer are installed in the base station 1. The system may be constructed such that all of the PDCP layer, RLC layer and lower layer are installed in the base station 1, and only simple functions, such as the packet routing function and the sequence number attaching function, are provided to aGW2.

In the case of the example in FIG. 25, data in the PDCP layer is exchanged between the mobile station 4 and aGW2, which is the host station, and data in the RLC layer is exchanged between the user terminal 4 and the base station 1.

In other words, data addressed to the mobile station flows from the upper layer (e.g. IP layer) to the PDCP layer first, and becomes PDCP SDU (Service Data Unit), and then header information (e.g. sequence numbers in PDCP layer) is added, and the PDCP PDU (Protocol Data Unit) is created.

The PDCP PDU is routed to the RLC layer, and becomes RLC SDU, and then header information (e.g. sequence number of RLC layer) is added, and RLC PDU is created. The RLC PDU arrives at the RLC layer of the mobile station via the processing in the lower layer. In the RLC layer, the header is removed and RLC SDU is reconstructed, then in the PDCP layer, the header of the PDCP PDU is removed, and PDCP SDU is created and routed to the upper layer of the mobile station.

In this protocol configuration, in the LTE communication system, packet transfer is executed in RLC SDU units or in PDCP SDU units, and reordering is executed in PDCP PDU units. Since RLC SDU and PDCP PDU are substantially the same data, they are simply referred to as "packets" in the present description, and it is assumed that a number of a packet described here indicates a sequence number of a PDCP PDU, unless otherwise specified.

FIG. 26 is a flow chart depicting an operation of the handover source base station device during handover.

When the handover source base station 1a receives the field strength of reception from the mobile station 4 via Measurement Report (step 101), the handover source base station 1a judges whether handover HO is necessary (step 102), and returns to the beginning if handover is unnecessary.

If it is decided that handover is necessary, the handover source base station 1a decides the handover target base station 1b based on the content of Measurement Report, and sends a handover request to the handover target base station 1b (step 103).

Then the handover source base station 1a receives a handover response which is sent from the handover target base station 1b (step 104), and judges whether data transference is executed (step 105). If the transference of the packets which are not sent to the mobile station and remain in the buffer is not executed, the handover source base station 1a sends HO instruction to the mobile station, and erases these packets (step 106). If the transference of the packets which are not sent to the mobile station and remain in the buffer is executed, on the other hand, the handover source base station 1a sends HO instruction to the mobile station, and forwards these packets to the handover target base station (step 107). The transference of the packets for a service which requires real-time processing, such as VoIP calling, is not executed, but is discarded. This is because discarding packets insures voice transmission and reception without delays. The transference of the packets for a service which requires high QoS is executed.

Then the handover source station 1a receives a resource release message which is sent from the handover target base station 1b (step 108), and executes a resource release (step 109).

FIG. 27 is a flow chart depicting operation of the handover target base station during handover.

When the handover target base station 1b receives an HO request (including mobile station ID and QoS information) from the handover source base station 1a (step 121), the handover target base station 1b performs call acceptance control based on this information, and judges whether acceptance of the mobile station is admitted or not (step 122). If not admitted, the handover target base station 1b performs post-processing (step 130), and ends handover control.

If acceptance of the mobile station, on the other hand, is admitted, the handover target base station 1b returns an HO response to the handover source base station 1a (step 123). Then the handover target base station 1b stores packets transferred from the handover source base station 1a in a buffer (step 124), and receives an HO completion report from the mobile station 4 (step 125). When the HO completion report is received, the handover target base station 1b sends the HO completion report to the host station 2 (step 126). When the handover completion report is received, the host station 2 switches the packet transmission path from the handover source base station 1a to the handover target base station 1b, and returns with the HO completion response to the handover target base station 1b(step 127). When the HO completion response is received from the host station 2, the handover target base station 1b starts sending packets forwarded from the handover target base station 1b preferentially to the mobile station, and starts sending packets received from the host station 2 to the mobile station after the above packets are sent (scheduling: step 128). The mobile target base station 1b also sends the resource release to the handover source base station 1a in parallel with step 128 (step 129), and performs post-processing (step 130), and ends handover control.

FIG. 28 is a flow chart depicting an operation of the mobile station during handover.

The mobile station 4 notifies the field strength of reception to the handover source base station using Measurement Report (step 151). The mobile station 4 then waits for an HO instruction from the handover source base station 1a, and if received (step 152), the mobile station 4 insures synchronization with the handover target base station 1b by L1/L2 signaling (step 153), and sends the handover completion report to the handover target base station 1b when synchronization is insured (step 154), then if packets are received from the handover target base station 1b, the mobile station executes reordering processing (steps 155 to 160).

In other words, when the lower layer packets are received from the handover target base station 1b, the control unit of the mobile station constructs RLC SDU, and transfers this RLC SDU to the reorder unit (step 155). The reorder unit checks whether the sequence number is continuous (step 156), and transfers this RLC SDU to the upper layer as PDCP SDU if the sequence numbers are continuous without missing any numbers (step 160). If the continuity of the sequence number of a RLC SDU ceases, on the other hand, the reorder unit stores RLC SDU(=PDC PDU)(step 157), and then checks whether the continuity of the sequence number is resumed by the received RLC SDU or not (step 158). If the continuity of the sequence numbers is resumed by the received RLC SDU, the reorder unit transfers this RLC SDU to the upper layer as PDCP SDU, and then transfers the stored RSC SDU(=PDCP PDU) to the upper layer (step 160).

In step 158, if the sequence numbers of the received RLC SDU are not continuous, the mobile station monitors whether a predetermined time has elapsed (step 159), and repeats the processing after step 157 if not, or transfers the stored PDCP PDU to the upper layer if elapsed, even if the sequence numbers are not continuous (step 160).

To execute packet transfer during handover in the LTE communication system, the following problem exists. That is, when handover is executed in the LTE communication system, the transference of the packets destined for the mobile station remaining in the handover source base station 1a is executed as mentioned above, thereby the packets are transferred to the handover target base station (forwarding). However, whether the transference of the packets executed during handover depends on whether this transference function is installed in the handover source base station.

As a result, even whether the handover source base station 1a did not execute packet transfer (packet forwarding), the mobile station 4, which was not notified, may judge that packet transfer was executed, and in such a case, after the handover, the reorder management unit of the mobile station must unnecessarily wait for the arrival of packets of which sequence numbers are continuous, until a predetermined time elapses. This results in that communication delays increase, and throughput deteriorates, and high quality communication quality cannot be maintained before and after the handover.

FIG. 29 shows an example of packets n−2 to n remaining in the handover source base station 1a. If these packets are not forwarded to the handover target base station 1b, the mobile station 4 must unnecessarily wait for the arrival of these packets n−2 to n, which will never be sent for a predetermined time after receiving packet n+1 from the handover target base station 1b. As a result, a communication delay occurs, and throughput of the entire system drops.

A first prior art that is available is a reassembling and reordering device, which restores packets before fragmentation from fragmented packets, and corrects reversal of the packet arrival sequence to recover the original sequence (Patent Document 1). However, this prior art relates to a reassembling and reordering device which restores packets before fragmentation from the packets fragmented in GTP tunnel (GTP: GPRS Tunneling Protocol) of GPRS (General Packet Radio Service), and corrects the reversal of the packet arrival sequence generated by the fragmentation and reassembles to the original sequence.

A second prior art that is available is a mobile communication system which realizes high-speed packet data transmission without generating data loss during handover between base stations in high-speed packet communication (Patent Document 2). In this mobile communication system, when a handover is generated between base stations in conformity with a communication state of a mobile station during high-speed packet communication between a base station and a mobile station, the handover source base station transfers the packet data to the handover target base station (forwarding).

However, neither the first nor the second prior arts are for suppressing an increase in communication delays or the deterioration of throughput due to the reordering of packets received from the handover target base station.

In view of the foregoing, it is an object of the present invention that the mobile station need not execute reordering at the packets in order of the sequence numbers even if they are not continuous, if the packets remaining in the handover source base station are not forwarded to the handover target base station (transference is not executed) when handover control is executed.

It is another object of the present invention that the mobile station executes reordering of the packets in order of the sequence numbers if the packets remaining in the handover source base station were forwarded to the handover target base station (transference was executed) when handover control is executed.

[Patent Document 1] Japanese Patent Application Laid-Open No. JP2004-135076A

[Patent Document 2] Japanese Patent Application Laid-Open No. JP2004-282652A

[Non-patent Document 1] 3GPP, "Requirements for Evolved UTRA (E-UTRA) and Evolved UTRAN (E-UTRAN)," TR25.913 V7.3.0, Release 7, March 2006

[Non-patent Document 2] 3GPP, "Evolved Universal Terrestrial Radio Access (E-UTRA) and Evolved Universal Terrestrial Radio Access Network (E-UTRAN)," TS36.300, Release 8, Vol. 4.0, January 2007

SUMMARY OF THE INVENTION

Reordering Method

A first aspect of the present invention is a reordering method for sending packets, to which numbers indicating sequence are attached, from a base station to a mobile station, and rearranging the packets in order of the sequence number in the mobile station. This reordering method comprises: a first step of sending data to notify that transference of the packets has been executed at the execution of handover sequence to the mobile station when a handover source base station transfers packets which have not been sent to the mobile station, out of packets received from a host station, to a handover target base station, and the packets are sent from the handover target base station to the mobile station; a second step of sending data to notify that transference of the packets is not executed at the execution of the handover sequence, to the mobile station when the packets are not transferred to the handover target base station; and a third step of executing reordering of the receive packets at the mobile station when the transference of the packets has been executed.

In the third step of the present invention, the reordering processing ends when packets having continuous sequence numbers are not received even if reordering processing of the received packets is executed for a predetermined time.

The reordering method of the present invention further comprises a step of deciding whether the packets, which have not been sent to the mobile station, are to be transferred to the handover target base station or to be erased, by referring to communication state information of the handover target base station that is received from the handover target base station at the execution of the handover sequence.

The reordering method of the present invention further comprises a step of deciding whether packets, which have not been sent to the mobile station, are to be transferred to the handover target base station or to be erased, depending on the type of service.

If numbers to indicate the sequence of the packets are attached to the packets in the base station, the numbers attached to the packets, which have not been sent from the handover source base station to the mobile station, are notified to the handover target base station when the packets are transferred to the handover target base station.

Communication System

A second aspect of the present invention is a communication system for sending packets to which numbers indicating sequence are attached, from a base station to a mobile station, and rearranging the packets in order of the sequence number in the mobile station. This communication system comprises a handover source base station, a handover target base station and a mobile station wherein (1) the handover source base station having: a buffer for storing packets received from a host station; a packet transmission unit for sending the packets stored in the buffer to the mobile station; and a control unit which sends data to notify that transference of the packets has been executed to the mobile station when the handover source base station transfers the packets, which have not been sent to the mobile station, to the handover target base station at the execution of handover sequence, and sends data to notify that transference of the packets is not executed to the mobile station when the packets are not transferred to the handover target base station, (2) the handover target base station having: a buffer which stores packets received from the handover source base station and packets received from the host station at the execution of handover sequence; a control unit which controls such that the packets received from the handover source base station are sent to the mobile station preferentially; and a transmission unit which sends packets to the mobile station, and (3) the mobile station having: a buffer which stores packets received from the base station; and a control unit which executes reordering of the received packets or does not execute reordering of the received packets based on the data received from the handover source base station and indicating whether transference of the packets has been executed.

The control unit of the handover source base station decides whether the packets, which have not been sent to the mobile station, are to be transferred to the handover target base station or to be erased by referring to the communication state information of the handover target base station that is received from the handover target base station at the execution of the handover sequence.

The control unit of the handover source base station decides whether the packets, which have not been sent to the mobile station, are to be transferred to the handover target base station or to be erased depending on the type of service.

Base Station

A third aspect of the present invention is a base station in a communication system for sending packets to which numbers indicating sequence are attached, from a base station to a mobile station and rearranging the packets in order of the sequence number in the mobile station, comprising: a buffer for storing packets received from a host station and packets received from a handover source base station at the execution of handover sequence; a packet transmission unit which sends packets stored in the buffer to the mobile station; a handover control unit which decides whether packets, which have not been sent to the mobile station, are to be transferred to a handover target base station at the execution of handover sequence or not, transfers the packets to the handover target base station and data to notify that transference of the packets has been executed to the mobile station if the packets are to be transferred to the handover target base station, and sends the data to notify that transference of the packets is not executed to the mobile station if the packets are not to be transferred to the handover target base station; and a transmission control unit which sends packets received by the handover source base station to the mobile station with priority over the packets received from the host station at the execution of handover sequence.

Mobile Station

A fourth aspect of the present invention is a mobile station in a communication system for sending packets to which numbers indicating sequence are attached, from a base station to a mobile station and rearranging the packets in order of the sequence number in the mobile station, comprising: a buffer for storing packets received from the base station; and a control unit which decides whether reordering of the packets received from a handover target base station is to be executed or not based on data received from a handover source base station at the execution of the handover sequence and indicating whether transference of the packets has been executed. The control unit ends reordering processing when packets having continuous numbers are not received even if reordering processing of the received packets is executed for a predetermined time.

BRIEF DESCRIPTION OF THE DRAWINGS

FIG. 16 is a system block diagram focusing on layers;

FIG. 19 is a diagram depicting transference of the packets during handover;

DESCRIPTION OF THE PREFERRED EMBODIMENTS (A) Outline of Embodiments

The problem is solved by enabling a base station and a mobile station to execute the following procedures.

Procedure 1: During handover, a handover source base station or a handover target base station notifies transference execution information, on whether data transference was executed or not, to the mobile station.

Procedure 2: When the transference execution information is received, the mobile station judges whether data transference was executed based on this information, and if data transference was not executed, the mobile station does not reorder the arrived packets, and transfers the packets immediately to the upper layer as received.

In the conventional method, the handover source base station does not notify the transference execution information to the mobile station during handover. Therefore, even when data transference is not executed, thereby the packets are not forwarded from the handover source base station to the handover target base station, the mobile station must wait needlessly for these not-forwarded packets until a predetermined time elapses, which generates an increase in communication delays and a deterioration of throughput. However if the mobile station is notified the transference execution information according to the method of the present invention, it can know whether the data transference is executed or not, and if the packets were not forwarded, reordering can be stopped, whereby unnecessary reordering attempt of packets can be prevented. As a result, communication quality before and after handover can be maintained to be higher than a conventional method.

(B) First Embodiment

Figure 1:
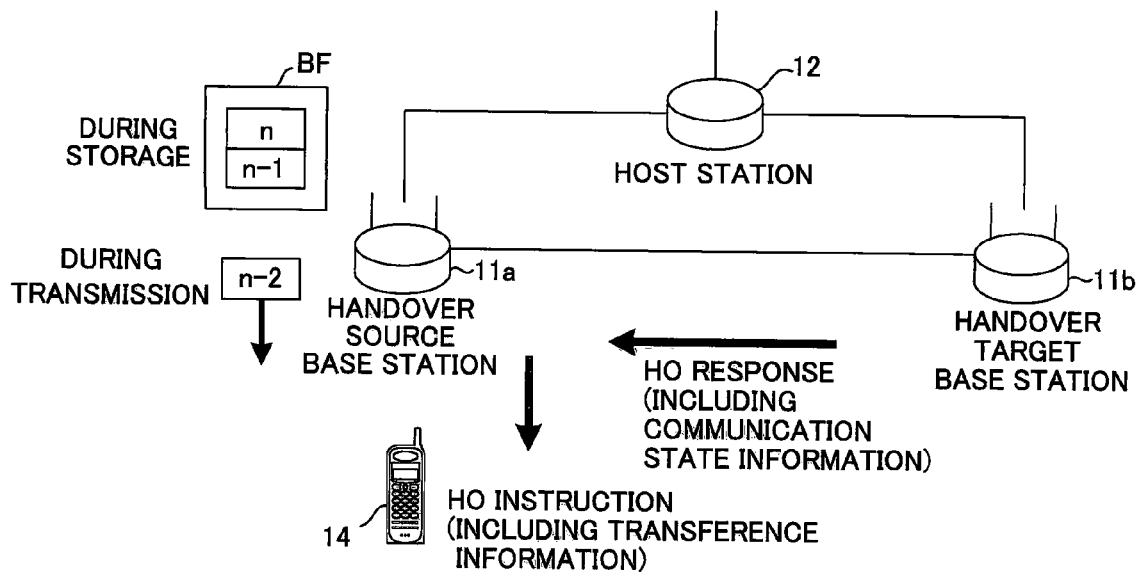
FIG. 1 is a diagram depicting a first embodiment.

FIG. 1 is a diagram depicting a first embodiment, where a handover source base station 11a judges the possibility of packet transfer (packet forwarding) based on the communication state of a handover target base station 11b when the handover sequence is executed, and notifies the forwarding execution information (transference execution information) to a mobile station 14.

In FIG. 1, when handover sequence is started, packets n−2 to n addressed to the mobile station are stored in a buffer BF of the handover source base station 11a and the packet n−2 is being transmitted to the mobile station, but the transmission of this packets n−2 does not end. During execution of the handover sequence, the handover target base station 11b sends information of the communication state on the handover target base station to the handover source base station 11a along with an HO response message. When the communication state information is received, the handover source base station 11a decides whether data transference can be executed depending on the communication state of the handover target base station 11b, and attaches the transference execution information, which indicates whether data transference is executed or not, to HO instruction and sends it to the mobile station 14.

Figure 2:
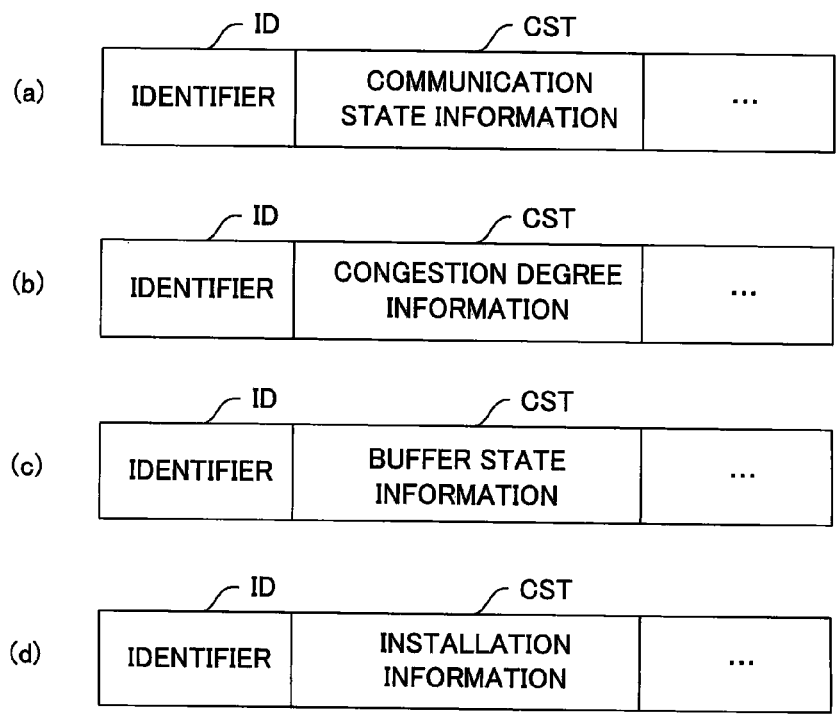
FIG. 2 shows format examples of HO response messages including communication state information.

FIG. 2 shows format example of HO response messages, including the communication state information. This message includes at least an identifier ID and communication state information CST, as shown in (A) of FIG. 2. As the identifier, a new identifier which at least the mobile station uses when it communicates with the handover target base station, may be included. And the address of the handover source base station 11a may be included as a destination address of this message and the address of the handover target base station 11b may be included as the transmission source address of this message. If the communication state information is represented by X bits, the number of states that can be defined is $2^X$.

As (B) of FIG. 2 shows, the communication state information CST has congestion degree information according to the degree of congestion of the handover target base station 11b. For example, if the congestion degree information is represented by two bits, four congestion degrees can be represented (serious congestion, heavy congestion, light congestion, no congestion). On the other hand, the communication state information CST may include buffer state information for notifying residual amount of memory of the handover target base station, as shown in (C) of FIG. 2. For example, the buffer state information is represented by 10 bits, and 1024 states can be represented. If the unit of this value is Kbytes, it is possible to represent that a maximum of 1024 Kbytes of memory is secured for this mobile station. Further the communication state information CST may include packet transfer function installation information in the handover target base station as shown in (D) of FIG. 2. This transfer function installation information is information to indicate whether the packet transfer function has been installed or not. For example, in order to transfer packets from the handover source base station 11a to the handover target base station 11b, packet transfer protocol (packet transfer function) is required. Information on whether such a function has been installed or not can be represented by 1 bit, and the installation of the function is notified to the handover source base station 11a by this bit.

After the handover source base station 11a receives the congestion state information message, the possibility of data transference is judged. For example, if "light congestion" is notified by the handover target base station 11b, data transference is executed. If "heavy congestion" is notified by the handover target base station 11b, data transference is not executed. On the other hand, if the residual memory amount of the handover target base station 11b is an amount that can sufficiently store all the packets to be transferred, data transference is executed. If it is notified that the residual memory amount of the handover target base station 11b is "0 Kbyte", then data transference is not executed. Further, if the handover target base station 11b has installed the packet transfer function, the data transference is executed. If it is notified that the packet transfer function is not installed, then data transference is not executed.

Figure 3:
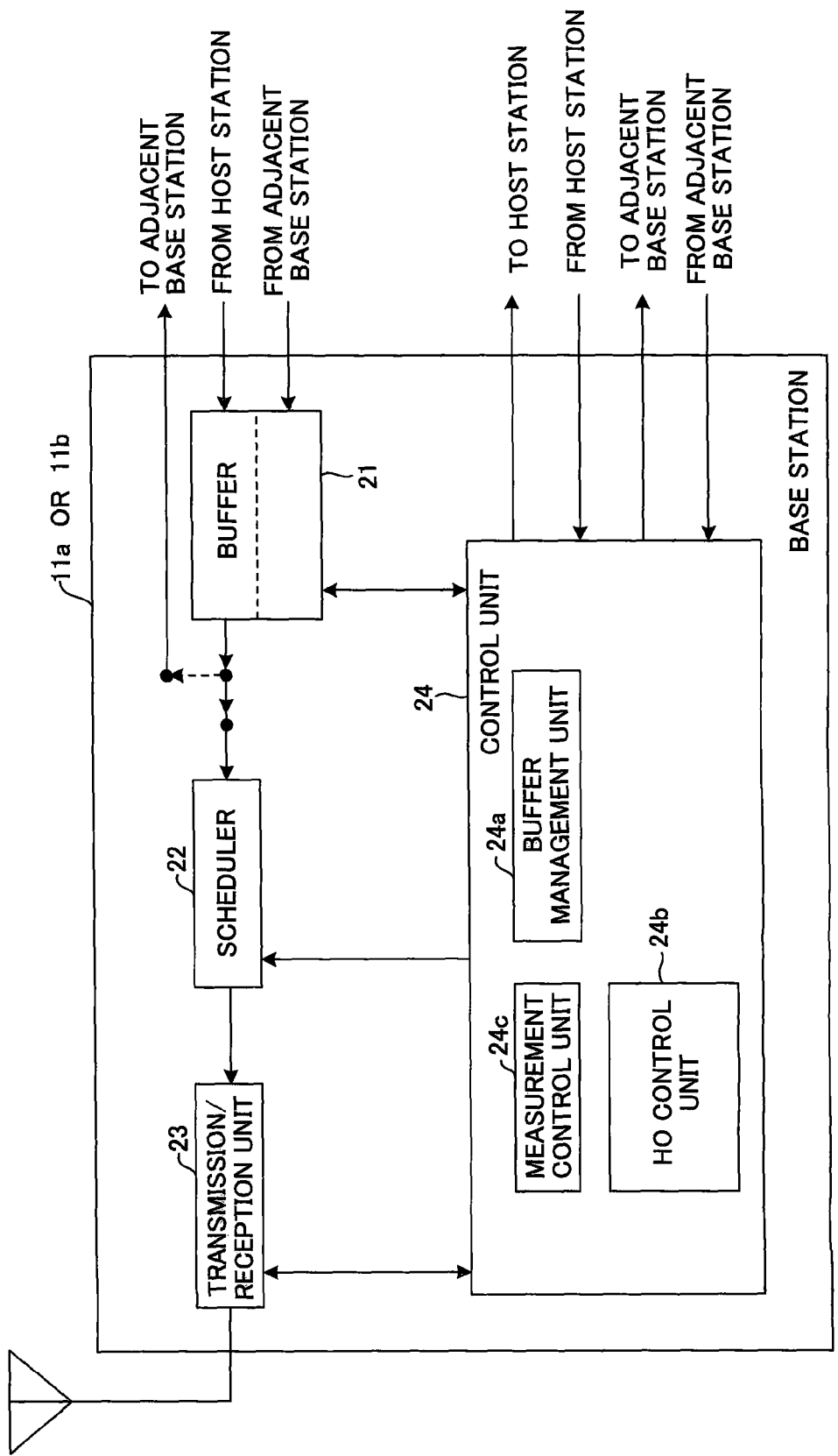
FIG. 3 is a block diagram of a base station.

FIG. 3 is a block diagram of the base station, in which a buffer unit 21, scheduler unit 22, transmission/reception unit 23 and control unit 24 are shown.

The buffer unit 21 is a memory for storing packets that flow in from a host station, and packets transferred from an adjacent base station (handover source base station). In FIG. 3, the base station physically has two buffers, but may have one physical memory partitioned by software. The scheduler unit 22 selects a mobile station with which radio transmission is performed, from among a plurality of mobile stations in communication, extracts packets of this mobile station stored in the buffer unit, and inputs them to the transmission/reception unit 23. The transmission/reception unit 23 encodes and modulates packets input from the scheduler, and transmits them by radio. The transmission/reception unit 23 also receives and demodulates control signals and various data which are sent from the mobile station.

The control unit 24 has a buffer management unit 24a, HO control unit 24b and measurement information control unit 24c. The buffer management unit 24a manages various packets stored in the buffer 21. If data transference is executed during handover, all the packets stored in the buffer unit 21 are transferred to the handover target base station. On the other hand, if data transference is not executed even if handover is generated, the buffer management unit 24a controls such that all the packets stored in the buffer unit 21 are erased. The HO control unit 24b executes the handover control described in FIG. 21, and the measurement control unit 24c collects various measurement information which is sent from the mobile station, such as radio quality CQI (Channel Quality Information) of the mobile station.

Figure 4:
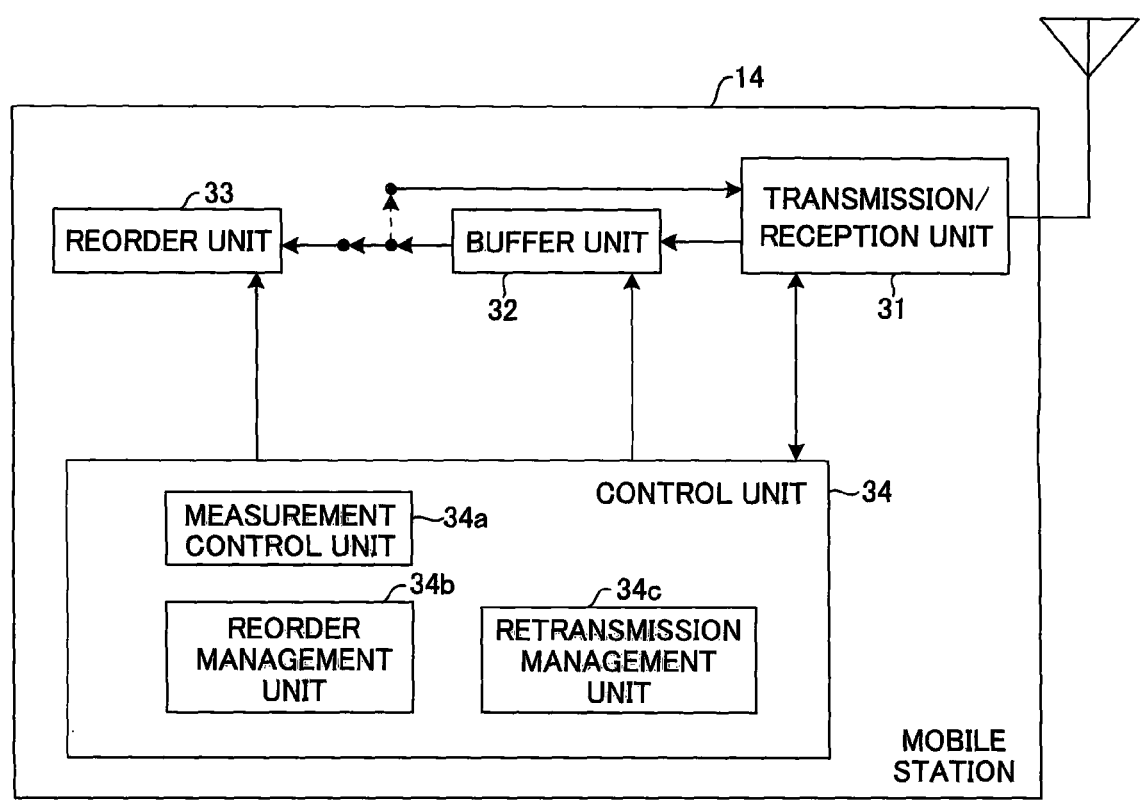
FIG. 4 is a block diagram of a mobile station.
Figure 24:
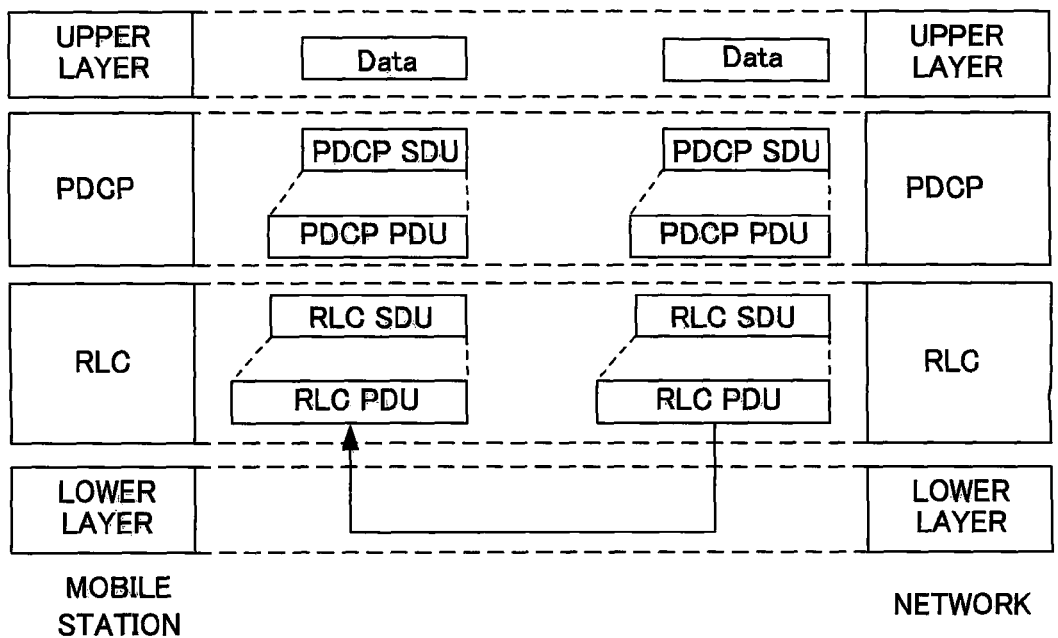
FIG. 24 is a diagram depicting a protocol configuration between a mobile station and network.
Figure 25:
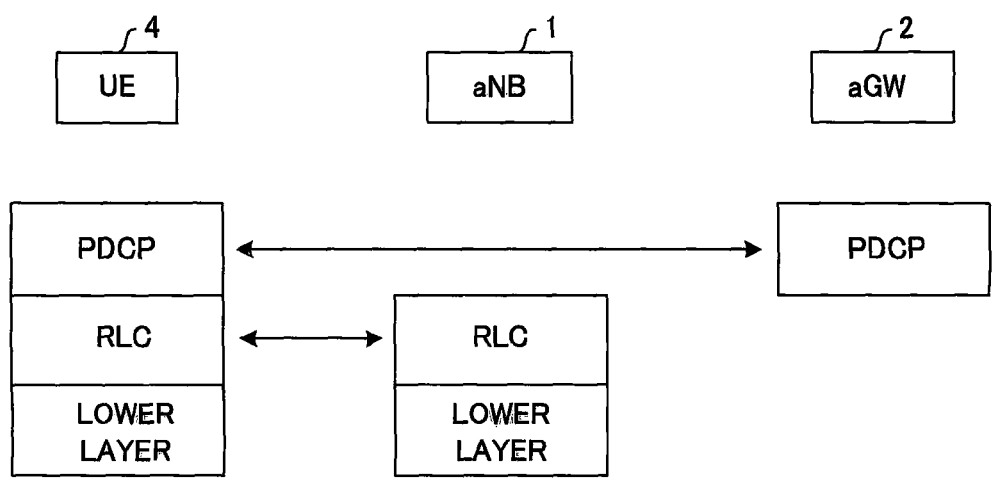
FIG. 25 is a diagram depicting a case when a PDCP layer is installed in aGW, which is a host station, and an RLC layer and a lower layer are installed in a base station.
Figure 26:
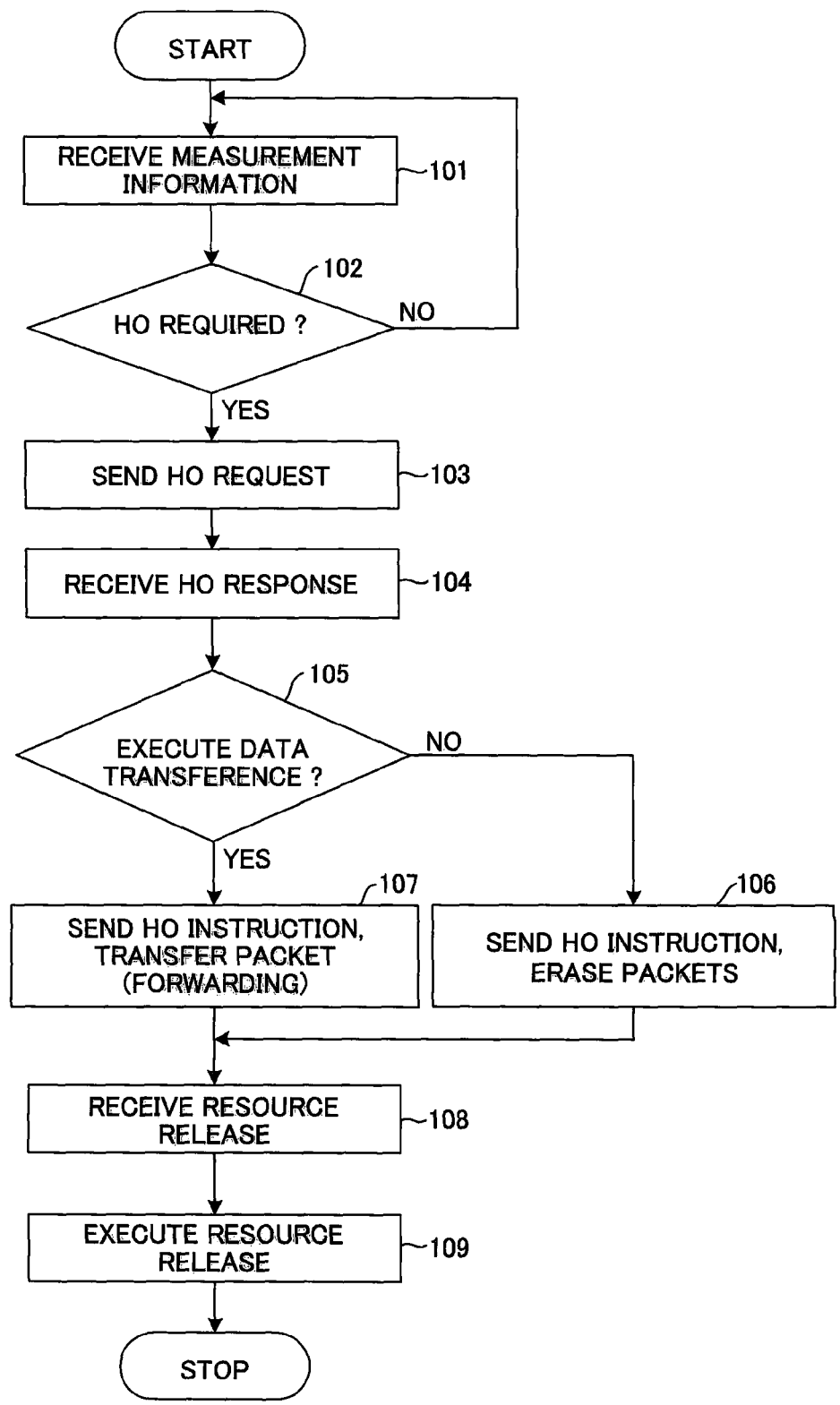
FIG. 26 is a flow chart depicting an operation of the handover source base station device during handover.
Figure 27:
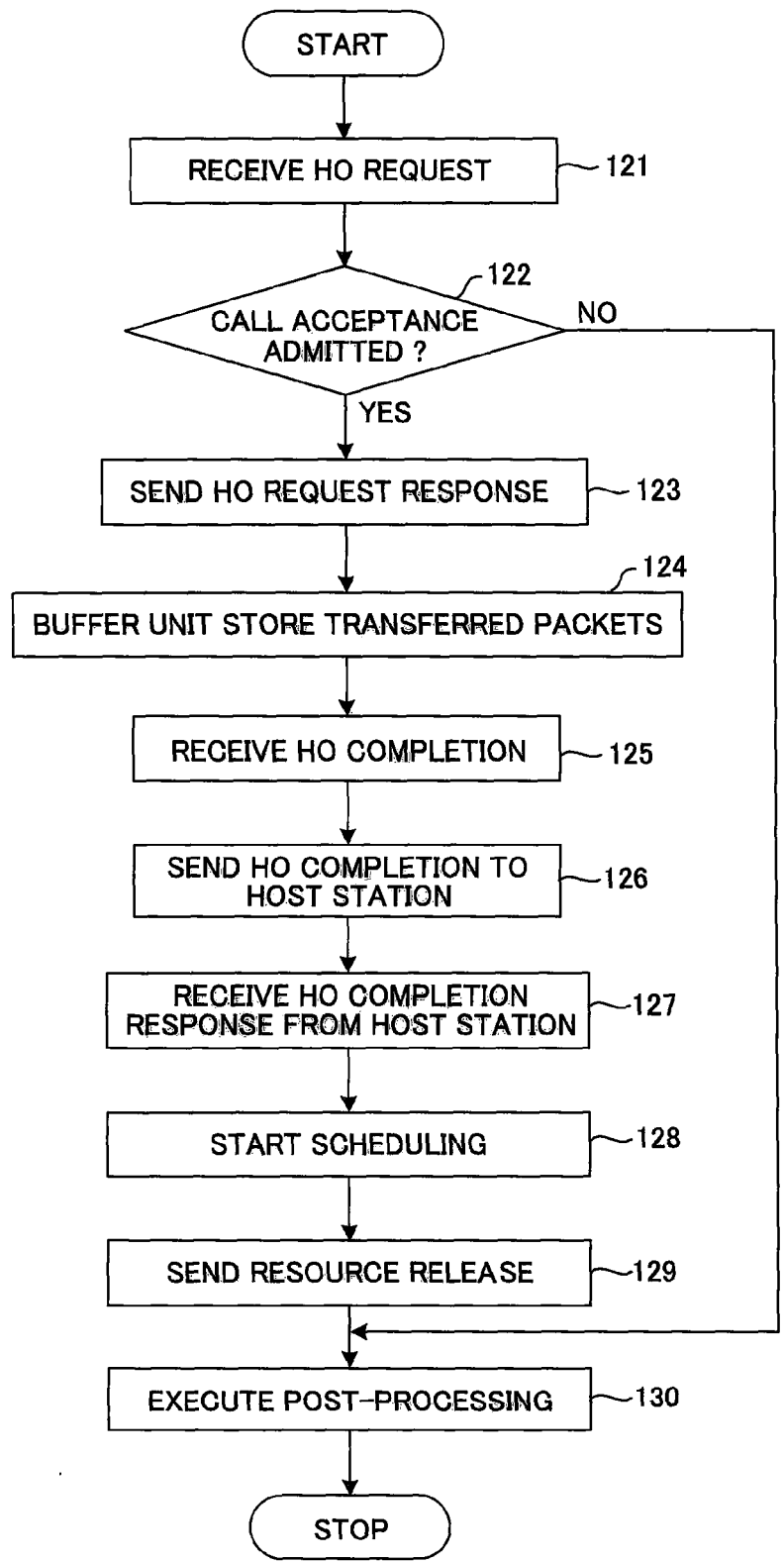
FIG. 27 is a flow chart depicting an operation of the handover target base station during handover.
Figure 28:
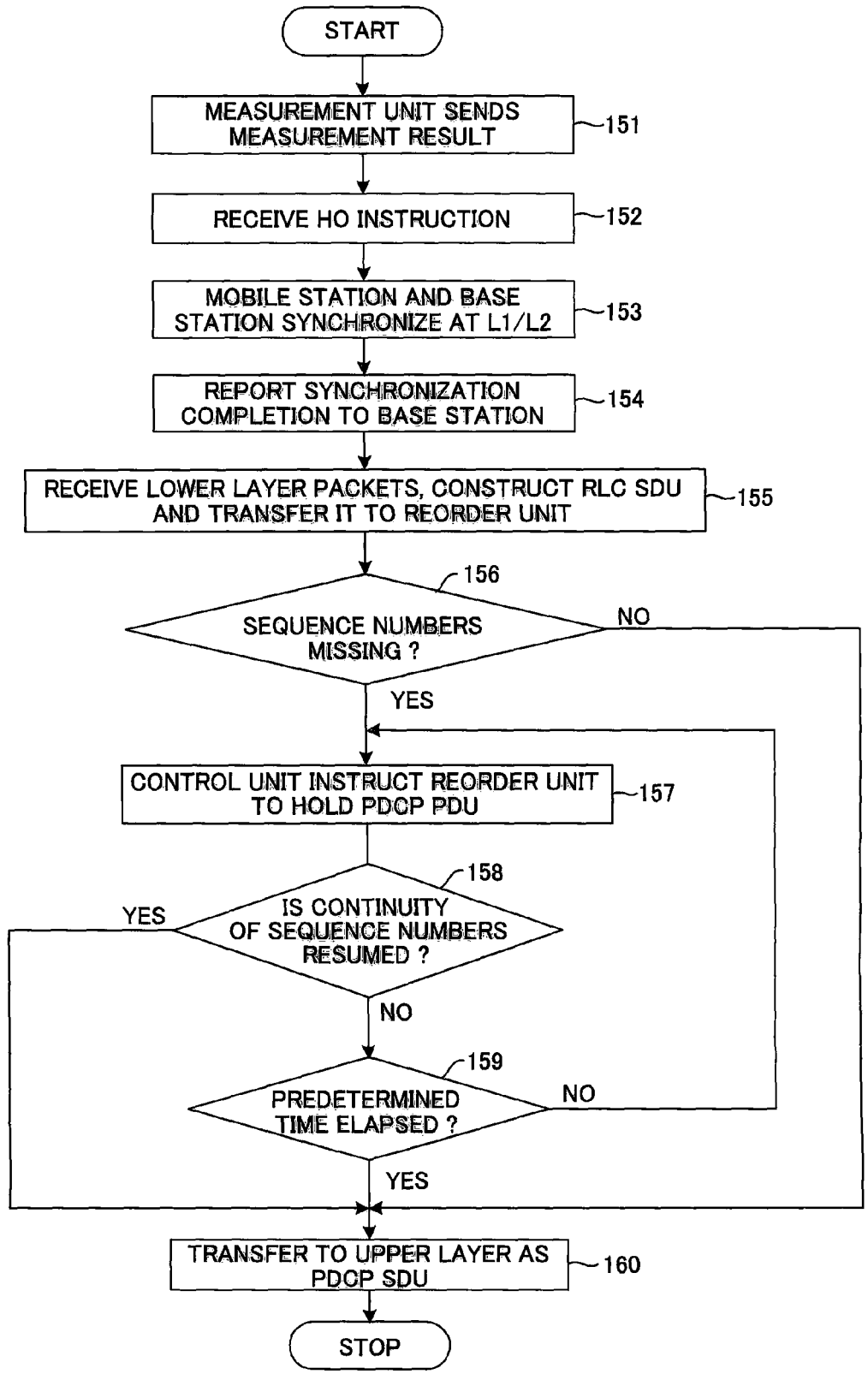
FIG. 28 is a flow chart depicting an operation of the mobile station during handover.
Figure 29:
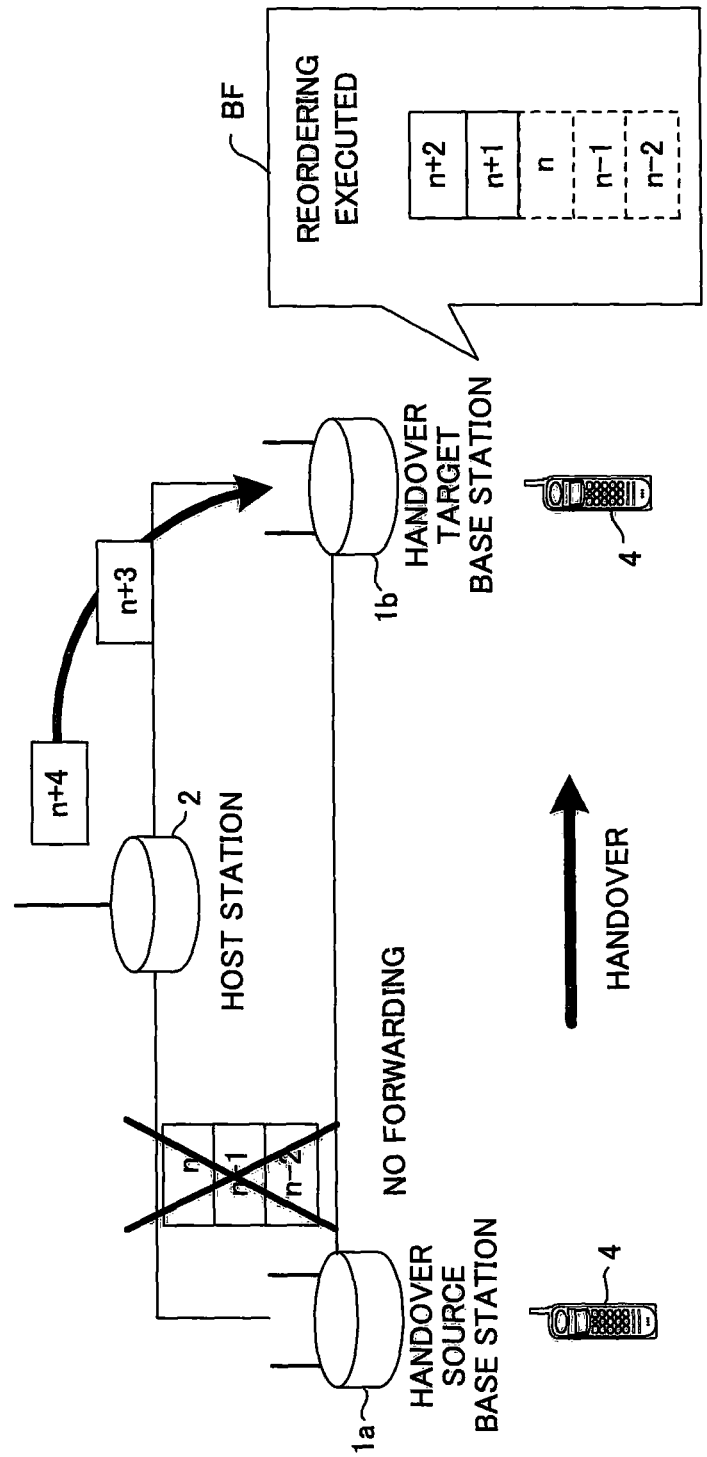
FIG. 29 is a diagram depicting a problem of prior art.

FIG. 4 is a block diagram of the mobile station, in which a transmission/reception unit 31, buffer unit 32, reorder unit 33 and control unit 34 are shown. The transmission/reception unit 31 transmits/receives packets and control information to/from the transmission/reception unit of the base station. If RLC PDU cannot be constructed from the received lower layer packets, the buffer unit 32 holds the packets until the RLC PDU is constructed, and if RLC PDU can be constructed, the buffer unit 32 removes the header and transfers the packets to the reorder unit 33 as RLC SDU (see FIG. 24). The reorder unit 33 has a function to rearrange RLC SDU (=PDCP PDU) in the order of sequence numbers, and transfer it to the upper layer. If it is detected that the continuity of the sequence number of a RLC SDU (=PDCP PDU) ceases, the reorder unit 33 stores the subsequent RLC SDU (=PDCP PDU) in the internal memory until the continuity of the sequence number is resumed by the received RLC SDU. If such RLC SDU (=PDCP PDU) does not arrive even if a predetermined time elapses, the reorder unit stops the reordering processing, and transfer all the stored PDCP PDU to the upper layer.

The control unit 34 has a measurement control unit 34a, reorder management unit 34b and retransmission management unit 34c. The measurement control unit 34a measures various measurement information to be sent to the base station. For example, radio quality CQI (Channel Quality Information) of the mobile station is measured. The reorder management unit 34b controls the reorder unit 33, and if the continuity of the sequence number of a PDCP PDU ceases, the reorder management unit 34b instructs the reorder unit 33 to store the PDCP PDU and wait for the arrival of PDCP PDU by which the continuity of the sequence numbers is resumed. When a predetermined time to wait for the arrival of the packets elapses, the reorder management unit 34b instructs the reorder unit 33 to stop reordering, and also removes the header of all the stored PDCP PDUs, and transfers them to the upper layer as PDCP SDUs, so that new PDCP PDUs can be received. During retransmission control time, the retransmission management unit 34c sends the retransmission request signals to the base station via the transmission/reception unit 31 as shown by the dotted line.

If forwarding is executed in FIG. 1, the transmission of the packet n−2 is stopped, and the packets n−2 to n are transferred to the handover target base station 11b. If forwarding of the packets is not executed, on the other hand, the transmission of the packet n−2 is stopped, and the packets n−2~n are erased from the buffer unit BF. The handover source base station 11a attaches the transference execution information to indicate whether data transfer (data forwarding) is executed, to an HO instruction message to the mobile station 14, and sends the HO instruction message.

Figure 5:
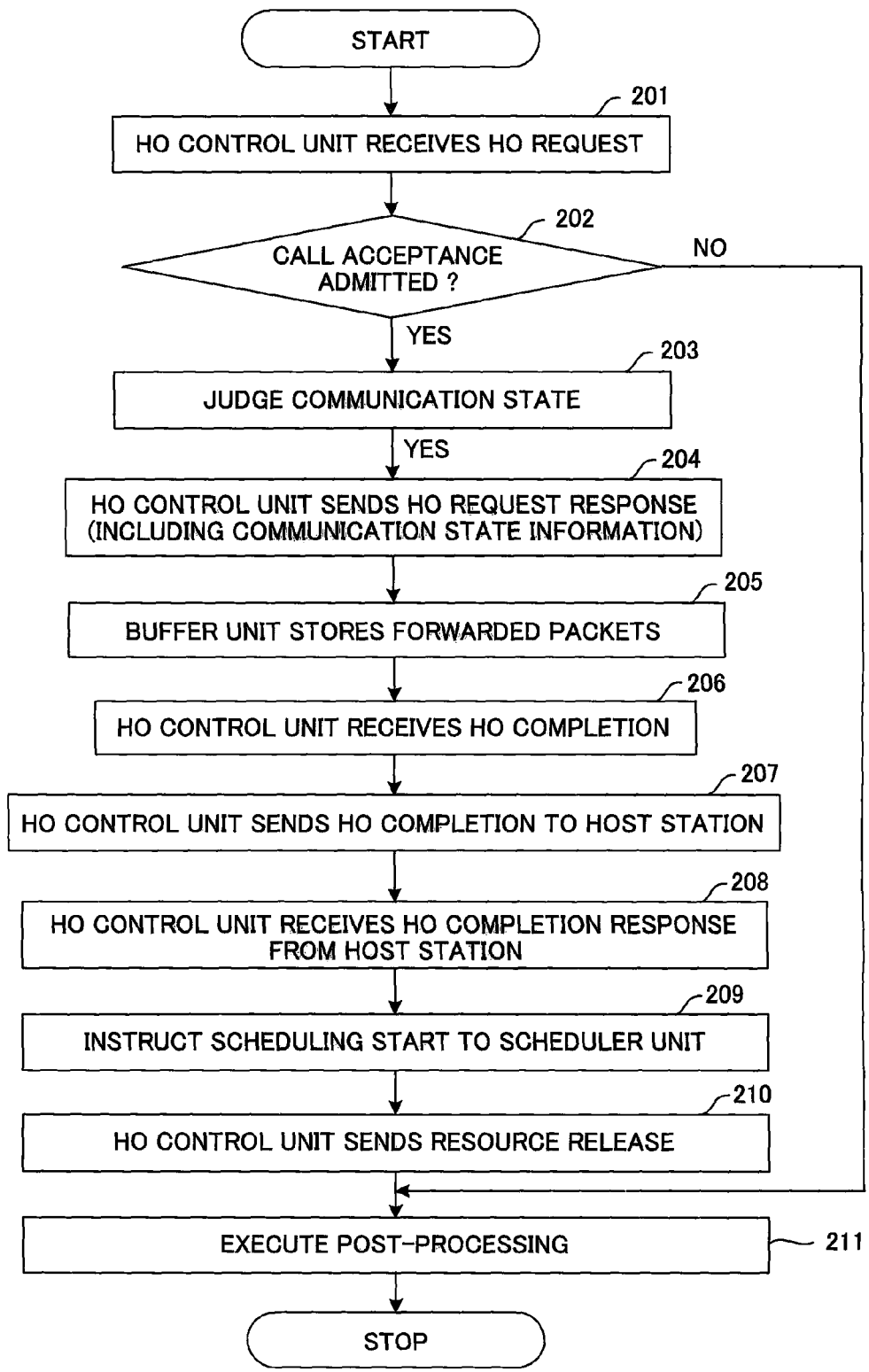
FIG. 5 is a flow chart depicting an operation of a handover target base station according to the first embodiment.

FIG. 5 is a flow chart depicting an operation of the handover target base station 11b for executing a series of above mentioned operations.

In FIG. 5, when the handover control unit 24b of the handover target base station 11b receives an HO request (including mobile station ID and QoS information) from the handover source base station 11a (step 201), the handover control unit 24b performs call acceptance control based on this information, and judges whether acceptance of the mobile station is admitted (step 202). If not admitted, post-processing is performed (step 211), and handover control ends.

If acceptance of the mobile station is admitted, on the other hand, the handover control unit 24b judges the communication state (congested state, buffer use state or function installed state) of the handover target base station 11b (step 203), and returns the HO request response message including the communication state information, which was described in FIG. 2, to the handover source base station 11a (step 204). Then the handover target base station 11b stores the packets forwarded from the handover source base station 11a into the buffer 21 in a case where the data transference is executed (step 124), and hereafter, the buffer unit 21 stores the packets forwarded from the handover source base station 11a.

If the handover control unit 24b receives the HO completion report from the mobile station 4 in this state (step 206), the handover control unit 24b sends the HO completion report to the host station 12 (step 207). When the handover completion report is received, the host station 2 switches the packet transmission path from the handover source base station 11a to the handover target base station 11b, and returns with the HO completion response to the handover target base station 11b (step 208). When the HO completion response is received from the host station 12, the handover control unit 24b of the handover target base station 11b instructs the scheduler 22 to start transmission of the packets. Thereby the scheduler 22 starts transmission of the forwarded packets to the mobile station 14 with priority, and then starts transmission of the packets received from the host station 12 to the mobile station after sending the above packets (scheduling: step 209). In parallel with step 209, the handover control unit 24b sends a resource release to the handover source base station 11a (step 210), performs post-processing (step 211), and ends handover control.

Figure 6:
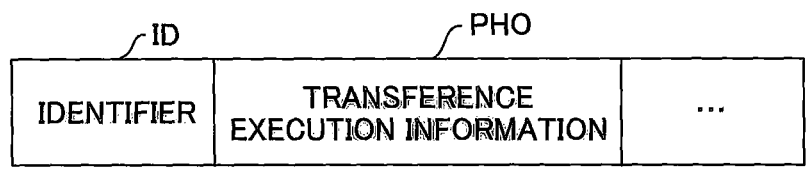
FIG. 6 shows a format example of an HO instruction message.

The handover source base station 11a notifies the mobile station 14 of whether data transference was executed or not using the HO instruction message, as mentioned above. FIG. 6 is a format example of the HO instruction message, and this message includes at least the identifier ID and transference execution information PH0. As the identifier, at least a new identifier, which the mobile station 14 uses when it communicates with the handover target base station 11b, is included. An address of the mobile station 14 may be included as the destination address of this message, and an address of the handover source base station 11a may be included in the transmission source address of this message. Also, in order to notify the transference execution information, at least one bit of information is included. For example, value "0" of this information indicates that data transference (packet forwarding) was executed, and value "1" of this information indicates that data transference was not executed. On the contrary, value "0" of this information may indicate that data transfer was not executed, and value "1" of this information may indicate that data transference was executed.

Figure 7:
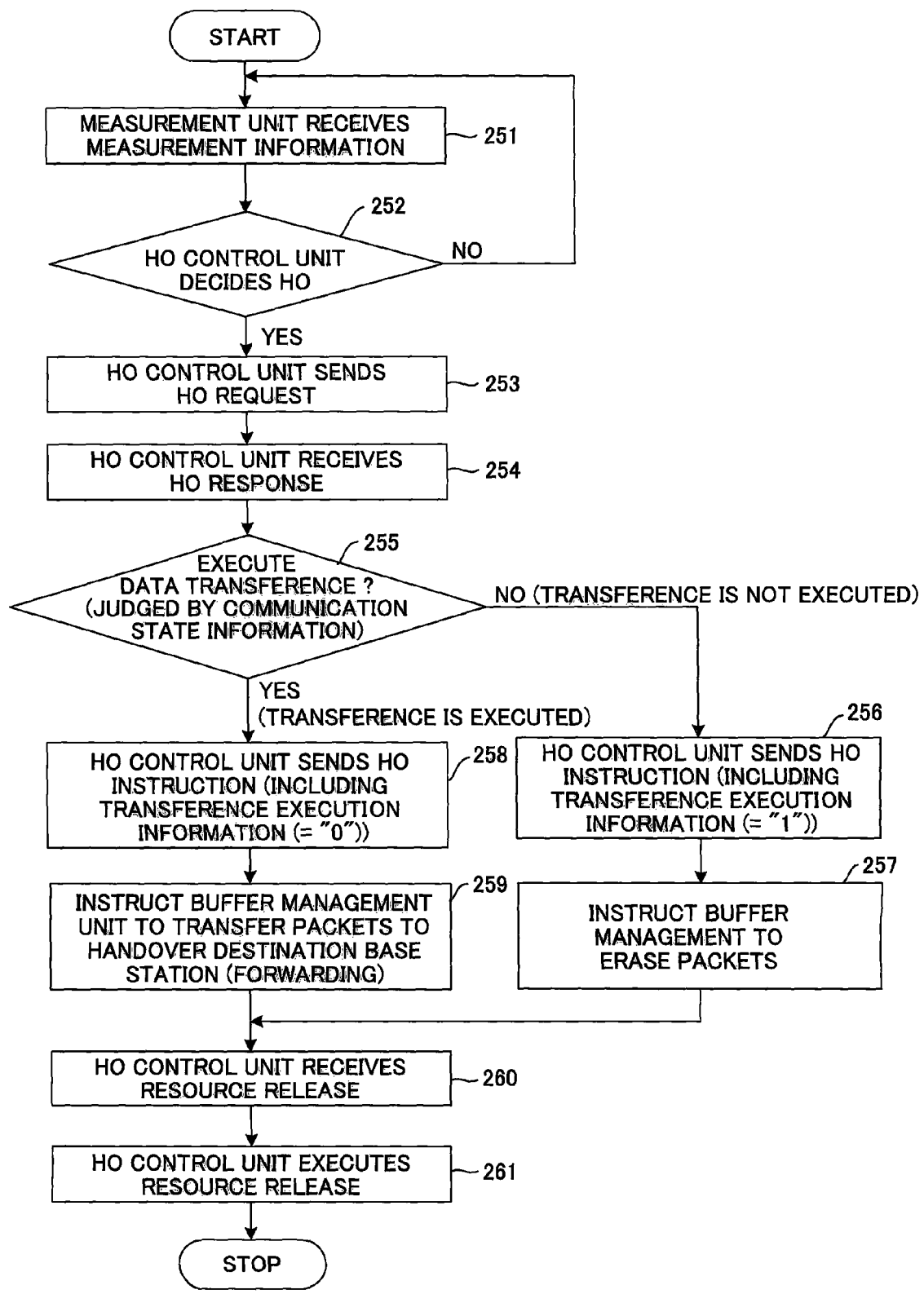
FIG. 7 is a flow chart depicting an operation of a handover source base station according to the first embodiment.

FIG. 7 is a flow chart depicting a device operation of the handover source base station for executing a series of the above mentioned operations.

In FIG. 7, when the measurement control unit 24a of a user of the handover source base station 11a receives the receive state information from the mobile station 14 using Measurement Report (step 251), the measurement control unit 24a judges whether handover HO is required based on this receive state information (step 252), and returns to the beginning if handover is unnecessary.

If it is decided that the handover HO is necessary, the handover control unit 24b determines the handover target base station 11b based on the content of Measurement Report, and sends the handover request to this handover target base station 11b (step 253).

Then the handover control unit 24b receives an HO response message transmitted from the handover target base station 11b (step 254), decides whether transfer of the packets (packet forwarding) is executed based on the communication state information CST included in this HO response message (step 255), and if it is decided that the transference of the packets is not executed, the HO control unit 24b enters the transference execution information PH0 (="1": transference is not executed) in the HO instruction message, and sends it to the mobile station (step 256), and instructs the buffer management unit 24a to erase the packets remaining in the buffer 21 (step 257).

If it is decided that the transference of the packets is executed in step 255, on the other hand, the HO control unit 24b enters the transfer execution information PH0 (="0": transference is executed) in the HO instruction message, and sends it to the mobile station 14 (step 258), and instructs the buffer management unit 24a to forward the packets remaining in the buffer 21 to the handover target base station 11b (packet forwarding) (step 259). Thereby the buffer management unit 24a forwards the packets, which have not been sent to the mobile station 14 and which remain in the buffer 21, to the handover target base station 11b via the route indicated by the dotted line. Then the HO control unit 24b receives the resource release message sent from the handover target base station 11b (step 260), and executes resource release (step 261).

In FIG. 1, the mobile station 14 receives the transference execution information PH0 included in the HO instruction message, and starts reordering if the transference was executed. Specifically, in the case when the mobile station 14 received n+1 and later packets before the packets n−2 to n, the mobile station 14 waits for the arrival of the packets n−2 to n until a predetermined time elapses, without transferring the packet n+1 to the upper layer. If the transference was not executed, on the other hand, the mobile station 14 immediately transfers the n+1 and later packets to the upper layer, and prepares for receiving the next packet without waiting for the arrival of the packets n−2 to n.

Figure 8:
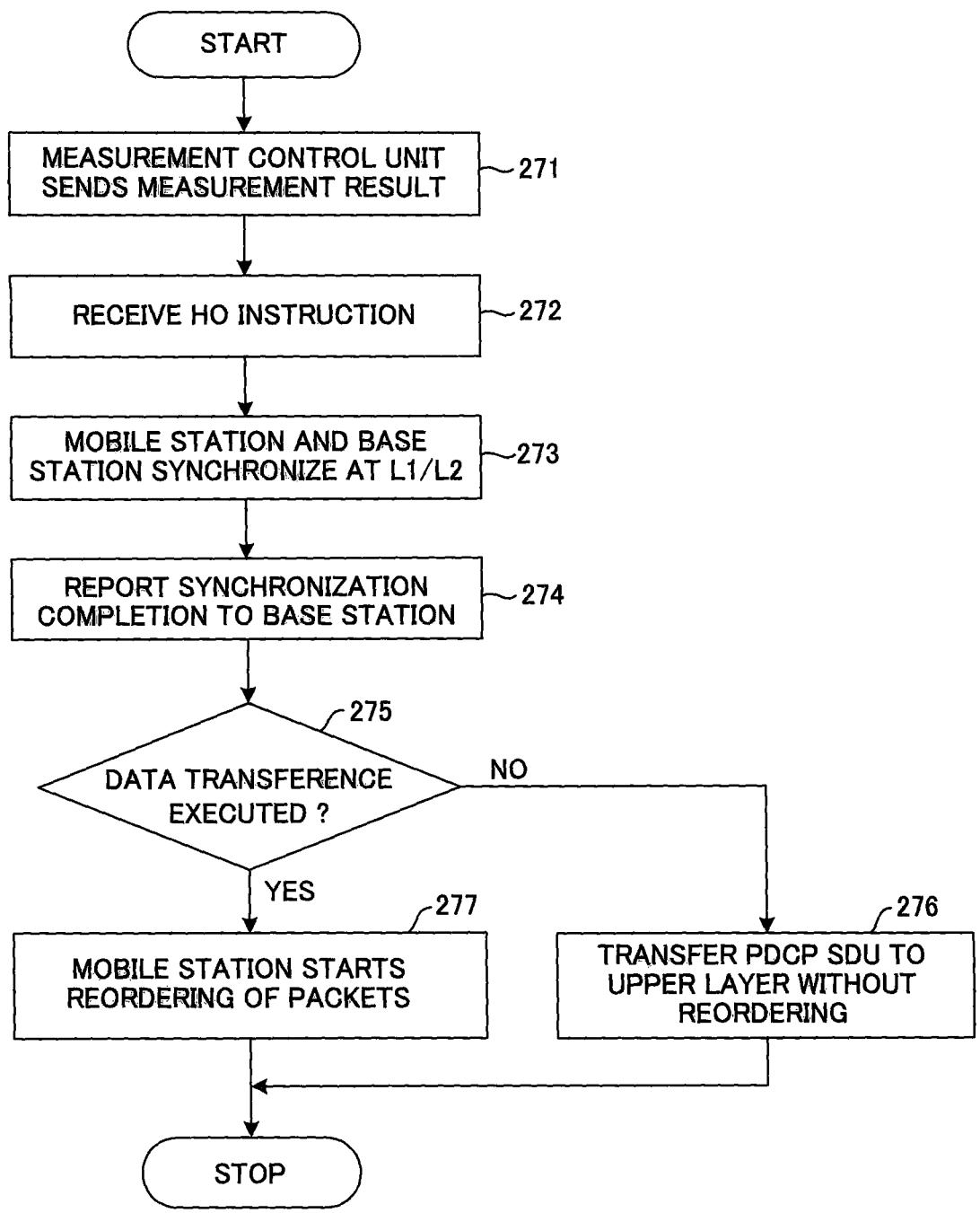
FIG. 8 is a flow chart depicting an operation of a mobile station according to the first embodiment.

FIG. 8 is a flow chart depicting an operation of the mobile station.

The measurement control unit 34a of the mobile station 14 notifies the receive state to the handover source base station 11a using Measurement Report (step 271). Then, the control unit 34 waits for an HO instruction message which is sent from the handover source base station 11a, and if the HO instruction message is received (step 272), the control unit 34 insures synchronization with the handover target base station 11b by L1/L2 signaling (step 273), and sends the handover completion report to the handover target base station 11b if synchronization is insured (step 274). Then the control unit 34 checks whether data transference (data forwarding) was executed by referring to the transference execution information PH0 of the HO instruction message received in step 272 (step 275), and if data transference was not executed, the control unit 34 performs a control to generate PDCP SDU using packets received from the handover target base station 11b, and transfer it to the upper layer, without executing reordering processing (step 276). If it is detected that data transference was executed in step 275, on the other hand, the reorder management unit 34b controls the reorder unit 33, and executes the reordering processing (step 277).

Figure 9:
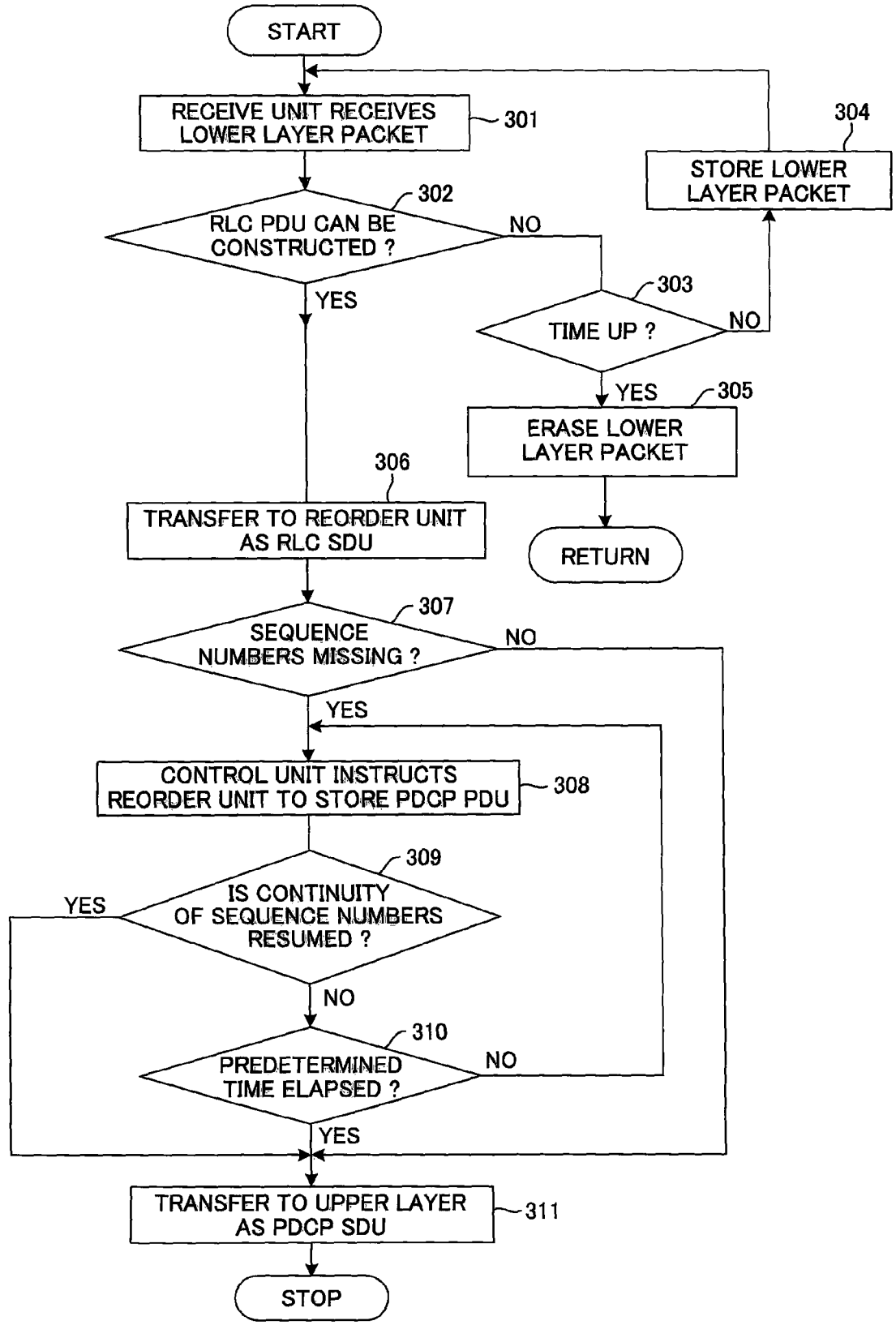
FIG. 9 is a flow chart depicting a reordering processing in the mobile station.

FIG. 9 is a flow chart depicting the reordering processing of the mobile station.

When the transmission/reception unit 31 receives lower layer packets from the handover target base station 11b, the reorder management unit 34b checks whether RLC PDU can be constructed (step 302), checks whether a predetermined time has elapsed if it cannot be constructed (step 303), and stores these lower layer packets in the buffer 32 (step 304) and executes processing after step 301 if the predetermined time has not yet elapsed. If RLC PDU cannot be constructed even if the predetermined time has elapsed after the lower layer packets are received, the lower layer packets are erased from the buffer (step 305).

If RLC PDU can be constructed using the lower layer packets received in step 302, on the other hand, the reorder management unit 34b transfers this RLC PDU to the reorder unit 33 as RLC SDU (step 306). If RLC SDU is received, the reorder unit 33 checks whether there is any missing sequence number and confirms the continuity of the sequence number (step 307), and transfers the RLC SDU to the upper layer as the RDCP SDU if sequence numbers are continuous without any missing (step 311). If there is any missing sequence number, however, the reorder management unit 34b instructs the reorder unit 33 to stores RLC SDU (=PDCP PDU) (step 308). Thereby the reorder unit 33 stores RLC SDU (=PDCP PDU) in the internal memory and checks whether the continuity of the sequence numbers is resumed by the received RLC SDU (step 309). If the continuity of the sequence numbers is resumed by the received RLC SDU, the reorder unit 33 transfers this RLC SDU to the upper layer as PDCP SDU, and transfers the stored RLC SDU (=PDCP PDU) to the upper layer (step 311).

If RLC SDU by which the continuity of the sequence numbers is resumed, is not received in step 309, the reorder unit 33 monitors whether the predetermined time has elapsed (step 310), repeats processing after step 308 if not elapsed, or transfers stored PDCP PDU to the upper layer if elapsed, even if the sequence numbers are not continuous (step 311).

As described above, according to the first embodiment, if packets which remain in the handover source station are not forwarded to the handover target base station when handover control is executed (transference is not executed), the mobile station does not have to execute reordering, even if the sequence numbers are not continuous, so unnecessary wait time is not generated, and delay time of data can be minimized and throughput of the entire system can be improved.

(C) Second Embodiment

Figure 10:
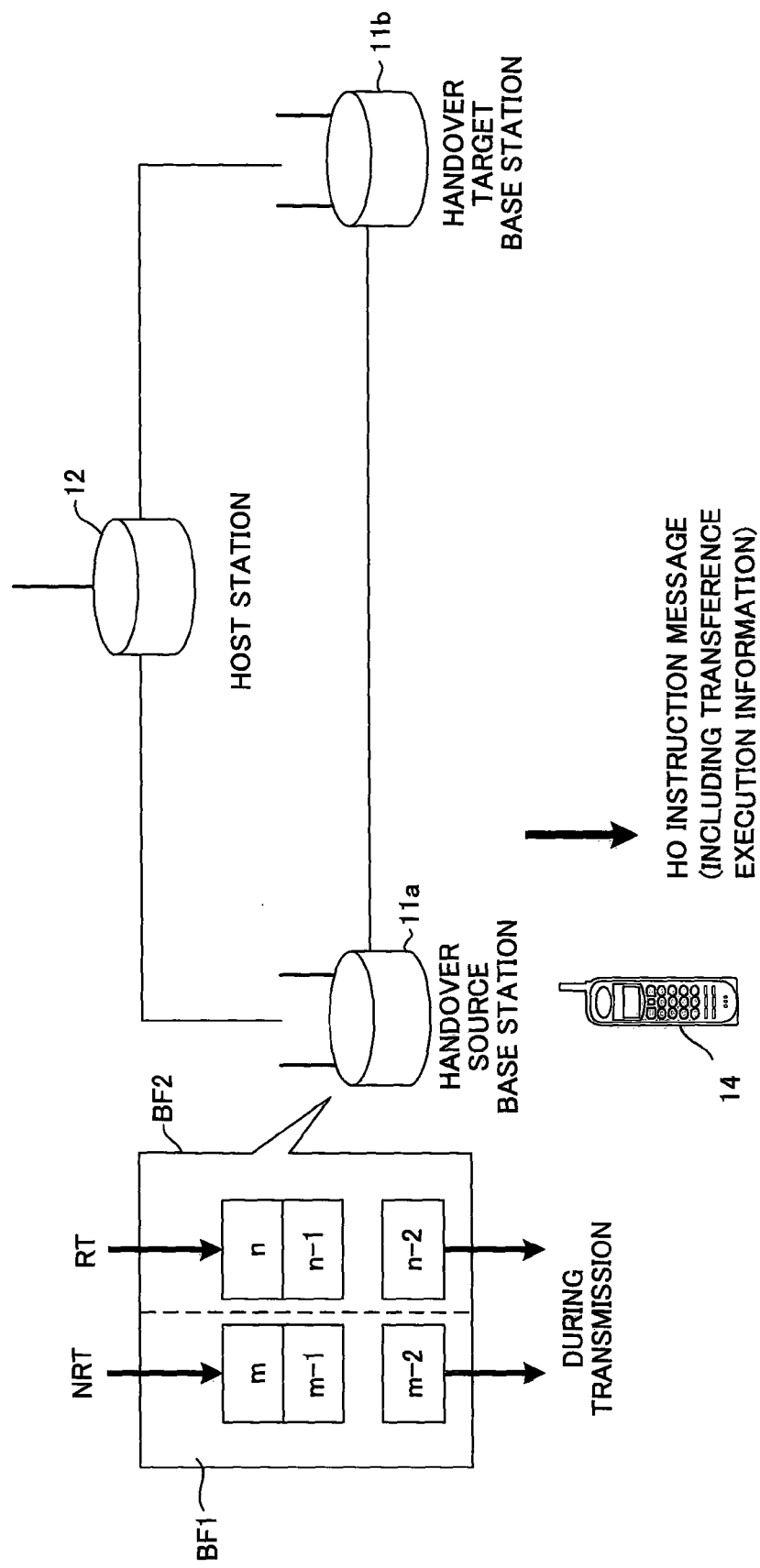
FIG. 10 is a diagram depicting a second embodiment.

FIG. 10 is a diagram depicting a second embodiment, where a handover source base station 11a judges whether packet transfer (packet forwarding) is performed or not based on the type of communication service when the handover sequence is executed, and notifies the forwarding execution information (transference execution information) to a mobile station 14.

It is assumed that the handover source based station 11a stores packets of non-real-time traffic (NRT traffic) in FTP (File Transfer Protocol) communication or Web communication and packets of real-time traffic (RT traffic) in VoIP communication and streaming respectively in different buffers BF11 and BR12, with different sequence numbers attached thereto and performs scheduling to transmit these packets, as shown in FIG. 10. It is also assumed that one of the packets m−2 to m constituting NRT traffic and packets n−2 to n constituting RT traffic is in-transmission and others are now stored in the buffers BF1, BF2 without being transmitted to the mobile station 14. In the second embodiment, the data transference is executed based on the policy that the packets of NRT communication service are forwarded, and the packets of RT communication service are not forwarded. This is because of the followings. For packets of communication service that must be processed in high real-time, such as packets of VoIP calls, it is preferable to discard them without forwarding in order to transmit and receive voice without delay. And for packets of low real-time and high QoS services it is preferable to forwarding them to the handover target base station in order to receive high quality data.

If the mobile station 14 which executes handover is performing RT communication, an HO control unit 24b (see FIG. 3) of the handover source base station 11a decides not to forward the packet n−2 which is currently being transmitted, and packets n−1 to n which are currently stored are not forwarded to the handover target base station 11b when the handover sequence is executed based on the above mentioned packet transference policy. And the HO control unit 24b includes a transference execution information PH0 indicating that forwarding was not performed in the HO instruction message, to notify the mobile station 14. The message format in this case is the same as FIG. 6. The mobile station 14, which received the transference execution information PH0, performs a similar operation as FIG. 8 and FIG. 9, as shown in the first embodiment, without executing the reordering processing.

If the mobile station 14 which executes handover is performing NRT communication, on the other hand, the HO control unit 24b of the handover source base station 11a decides to forward the packet m−2 which is currently being transferred, and packets m−1 to m which are currently stored are forwarded to the handover target base station 11b when handover sequence is executed. Then transference execution information PH0 to notify that forwarding was executed is included in the HO instruction message, and is sent to the mobile station 14. The message format in this case is the same as FIG. 6. Mobile station 14, which received the transference execution information PH0, performs an operation the same as FIG. 8 and FIG. 9, and reordering processing is performed as shown in the first embodiment.

Figure 11:
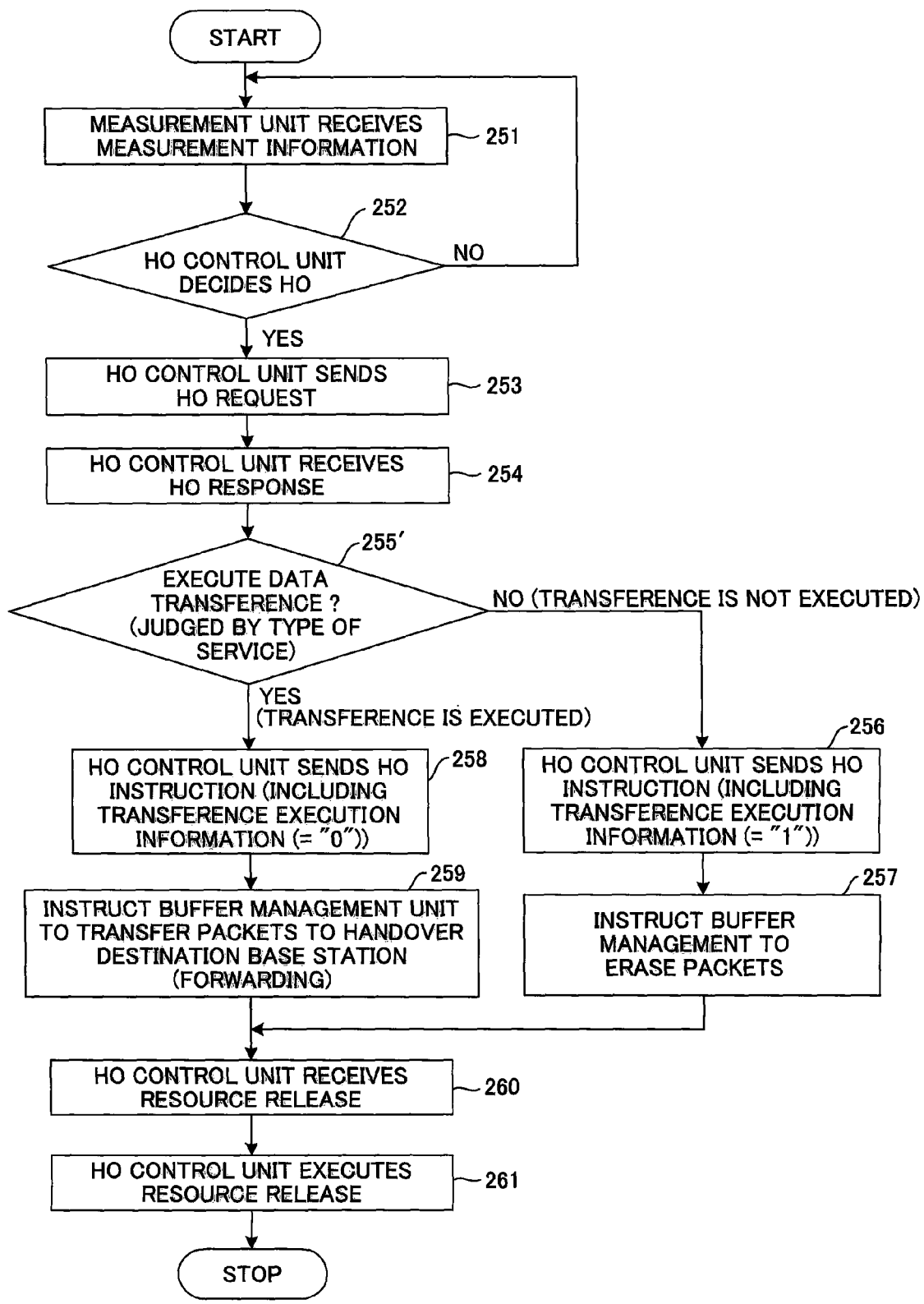
FIG. 11 is a flow chart depicting an operation of a handover source base station according to the second embodiment.

FIG. 11 is a flow chart depicting an operation of the handover source base station 11a for executing the above mentioned series of operations, in which the same steps as the flow chart of the first embodiment in FIG. 7 are denoted with the same numbers. The difference is step 255', in which it is determined whether the transference of the packets (packet forwarding) is executed or not depending on whether the communication service is NRT communication service or RT communication service. If the communication service is RT communication service, an HO control unit 24b decides that forwarding is not executed, enters the transference execution information PH0 (="1": transference is not executed) in an HO instruction message, and sends it to the mobile station (step 256), and instructs a buffer management unit 24b to erase the packets remaining in a buffer 21 (step 257).

If it is decided that the transference of the packets is executed in step 255', on the other hand, the HO control unit 24b enters the transference execution information PH0 (="0": transference is executed) in the HO instruction message, and sends it to the mobile station 14 (step 258), and instructs the buffer management unit 24a to forward the packets (transfer the packets) remaining in the buffer 21 to the handover target base station 11b (step 259).

Variant Form

Figure 12:
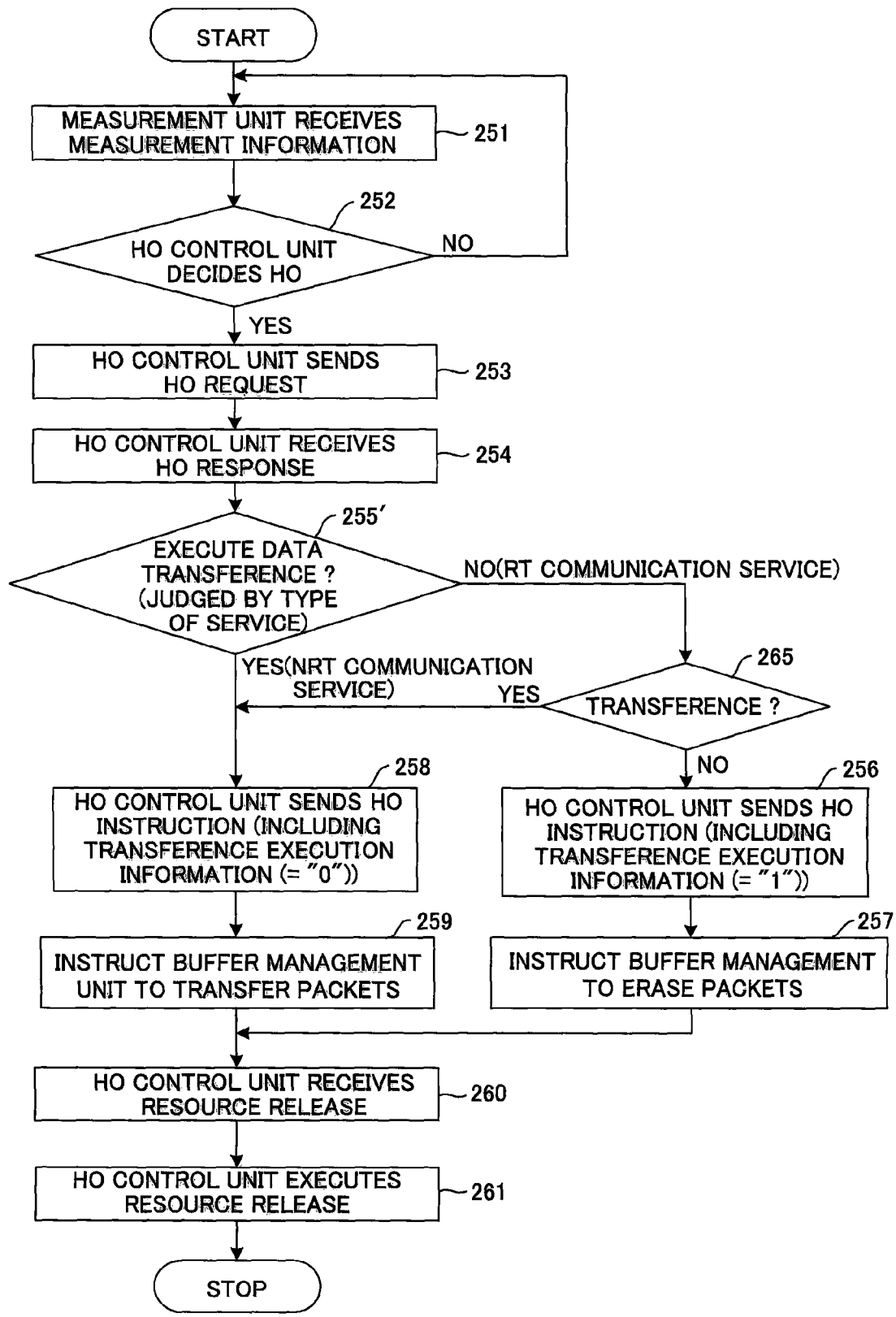
FIG. 12 is a flow chart depicting an operation of a handover source base station according to a variant form.

In the second embodiment, transference is not executed if the communication service is RT communication service, but in some cases, packets may or may not be forwarded depending on the setting even if the communication service is RT communication service (e.g. VoIP calls). This variant form is for supporting such a case, and FIG. 12 is a flow chart depicting an operation of the handover source base station 11a of the variant form, in which the same steps as the processing flow of the first embodiment in FIG. 11 are denoted with the same numbers. The difference is the existence of step 265, in which it is checked whether the setting is to forward packets or not if the communication service is RT communication service, and if not, the HO control unit 24b decides that forwarding is not executed, enters the transference execution information PH0 (="0": transference is not executed) in the HO instruction message, and sends it to the mobile station (step 256), and instructs the buffer management unit 24b to erase the packets remaining in the buffer 21 (step 257).

If the setting is to forward packets in step 265, on the other hand, the HO control unit 24b enters the transference execution information PH0 (="0": transference is executed) in the HO instruction message, and sends it to the mobile station 14 (step 258), and instructs the buffer management unit 24a to forward the packets (transfers the packets) remaining in the buffer 21 to the handover target base station 11b (step 259).

Figure 13:
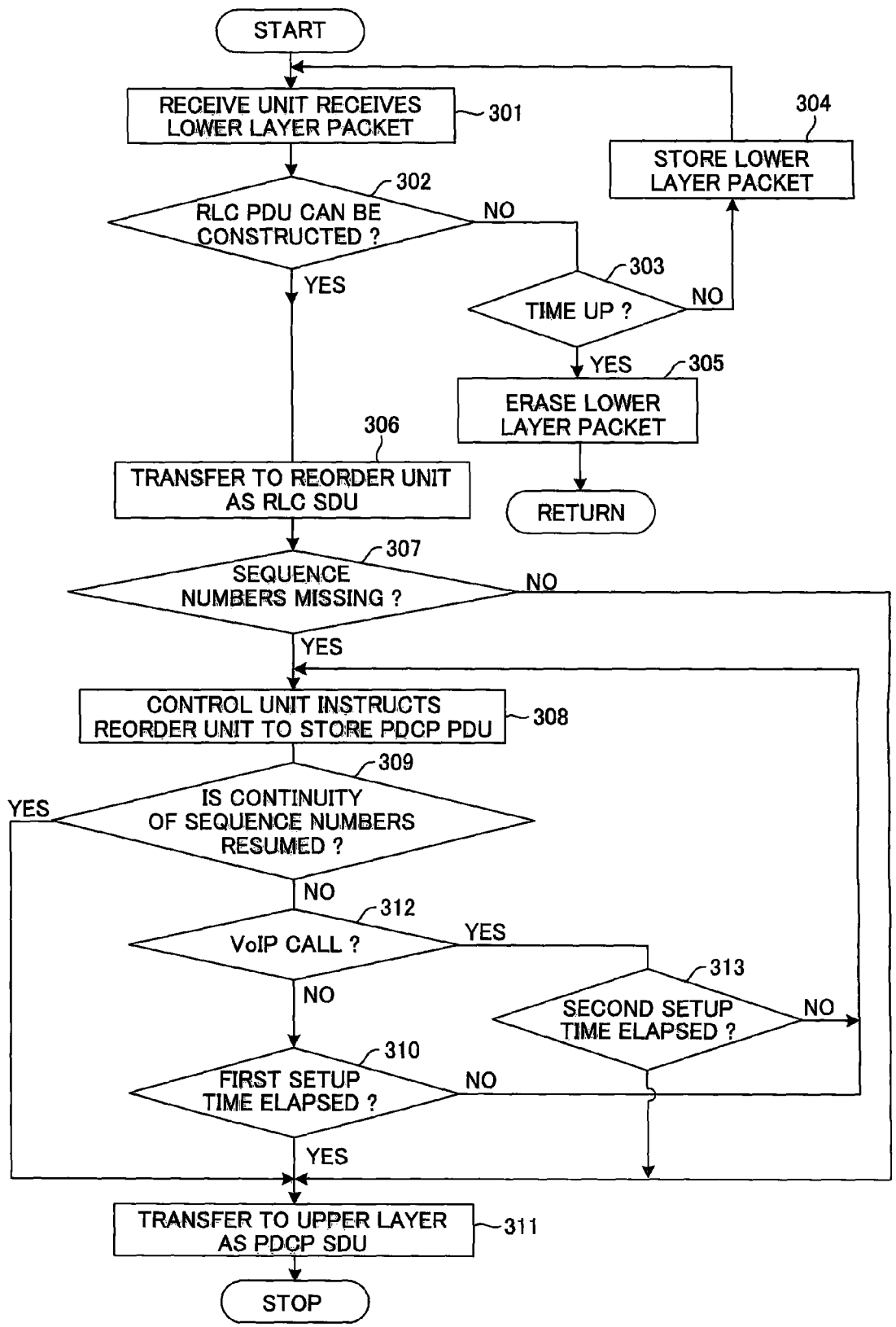
FIG. 13 is a flow chart depicting a reordering processing in a mobile station according to a variant form.

FIG. 13 is a flow chart depicting the reordering processing in the mobile station of the variant form, in which the same steps as the processing flow of the first embodiment in FIG. 9 are denoted with the same numbers, and the difference is that the time to continue reordering processing is switched depending on whether the communication service is VoIP calling or not. In other words, it is checked whether the call type is a VoIP call (step 312) if RLC SDU of which sequence numbers are continuous is not received in step 309, and if not VoIP calling, the control unit 34 monitors whether the predetermined first setup time TS1 has elapsed (step 310), repeats the processing after step 308 if not elapsed, or transfers the stored PDCP PDU to the upper layer if the setup time has elapsed, even if the sequence numbers are not continuous (step 311). If the call type is VoIP calling in step 312, the control unit 34 monitors whether a second setup time TS2 (<TS1) has elapsed (step 313), repeats the processing after step 308 if not elapsed, or transfers the stored PDCP PDU to the upper layer if the setup time has elapsed, even if the sequence numbers are not continuous (step 311).

According to the above mentioned variant form, the quality of VoIP can be improved by forwarding packets even in the case of VoIP calling, and delay time due to reordering processing can be decreased by decreasing the setup time TS2.

(D) Third Embodiment

Figure 14:
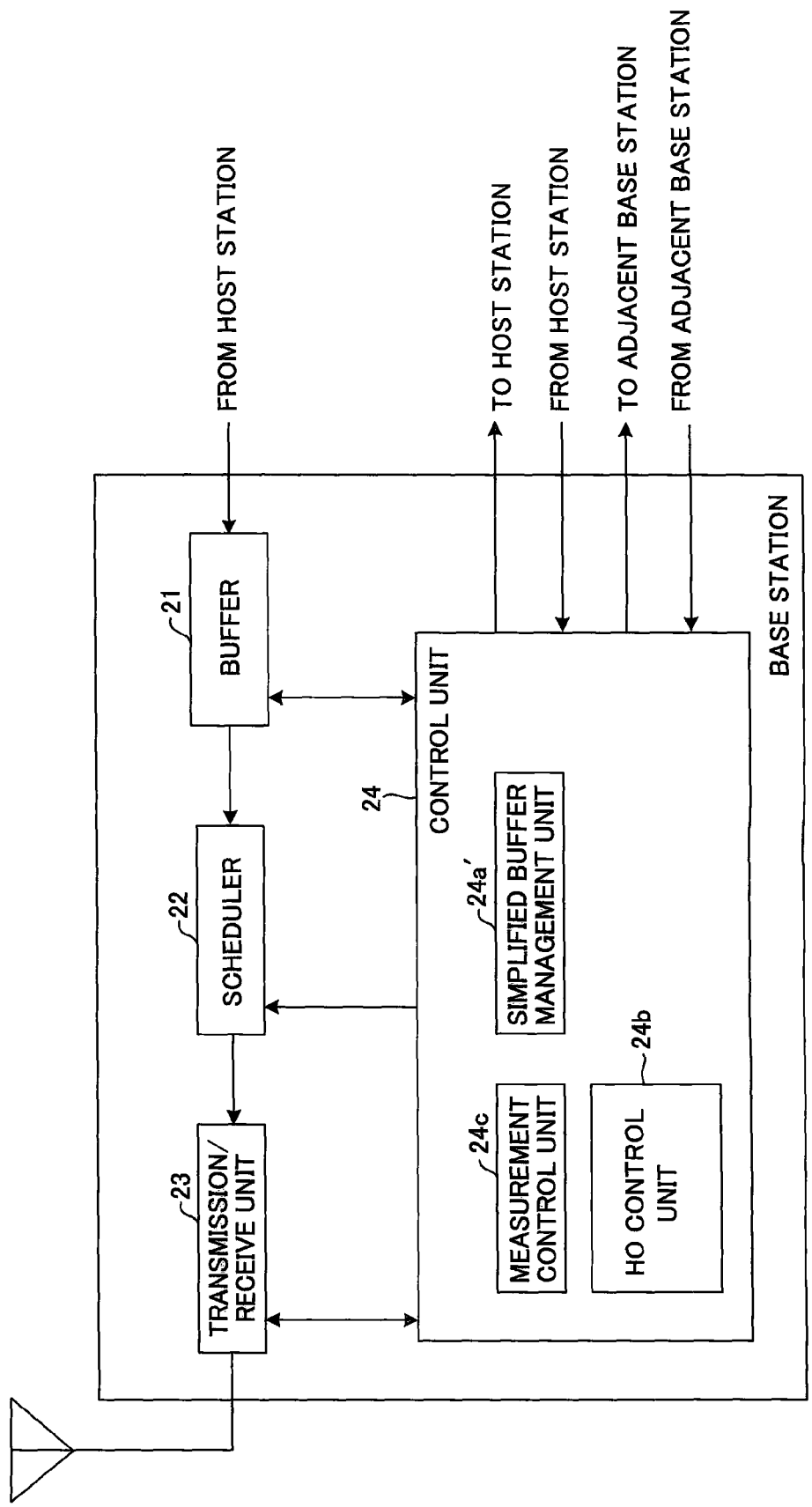
FIG. 14 is a block diagram of a base station of which buffer management unit has a simplified configuration without packet transfer functions.

The third embodiment is an embodiment to determine whether packet transfer (packet forwarding) is possible depending on whether a handover source base station has a packet transfer function or not, notifying this execution information to a mobile station. FIG. 14 is a block diagram depicting a base station in which a buffer management unit has a simplified configuration without a packet transfer function, and the same portions as the base station of the first embodiment in FIG. 3 are denoted with the same symbols. The difference is that the buffer management unit 24a' has a simplified configuration, and does not have a function to forward packets to the handover target base station 11b or a packet transfer scheduler function.

Figure 15:
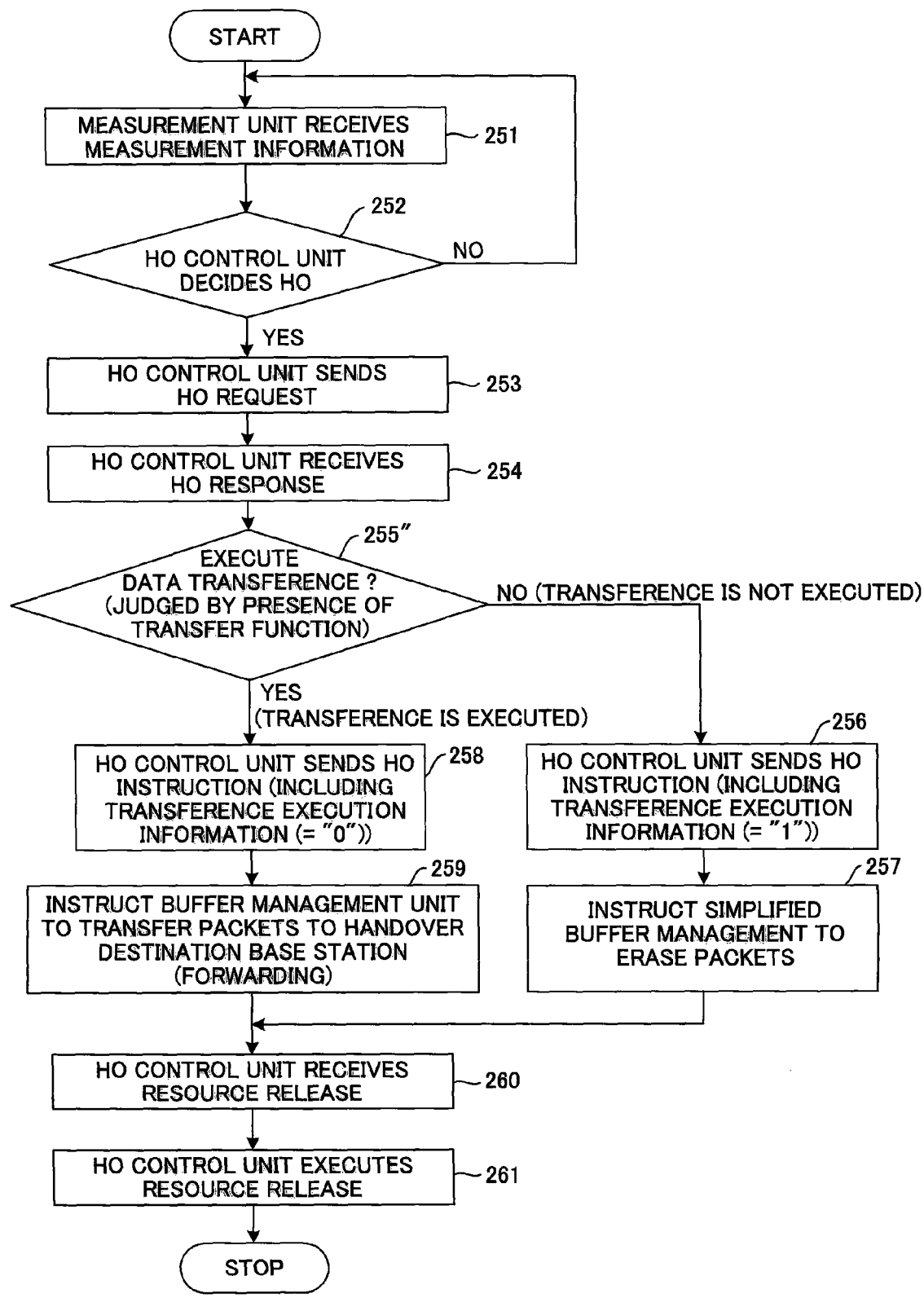
FIG. 15 is a flow chart depicting an operation of a handover source base station according to the third embodiment.

FIG. 15 is a flow chart depicting an operation of the handover source base station, in which the same steps as the flow chart of the first embodiment in FIG. 7 are denoted with the same numbers. The difference is that it is determined whether the transference of the packets (packet forwarding) is executed or not depending on whether the forwarding function and the packet transfer scheduler function are installed in the handover source base station 11a in step 255". If these functions are not installed, an HO control unit 24b decides that forwarding is not executed, enters the transference execution information PH0 (="1": transference is not executed) in an HO instruction message, and sends it to the mobile station (step 256), and instructs a buffer management unit 24b to erase the packets remaining in a buffer 21 (step 257).

If the forwarding function and the packet transfer scheduler function are installed in step 255", on the other hand, the HO control unit 24b decides to execute the transfer of the packets, enters the transference execution information PH0 (="0": transference is executed) in the HO instruction message, and sends it to the mobile station 14 (step 258), and instructs the buffer management unit 24a to forward the packets (transfer the packets) remaining in the buffer 21 to the handover target base station 11b (step 259).

(E) Fourth Embodiment

Figure 17:
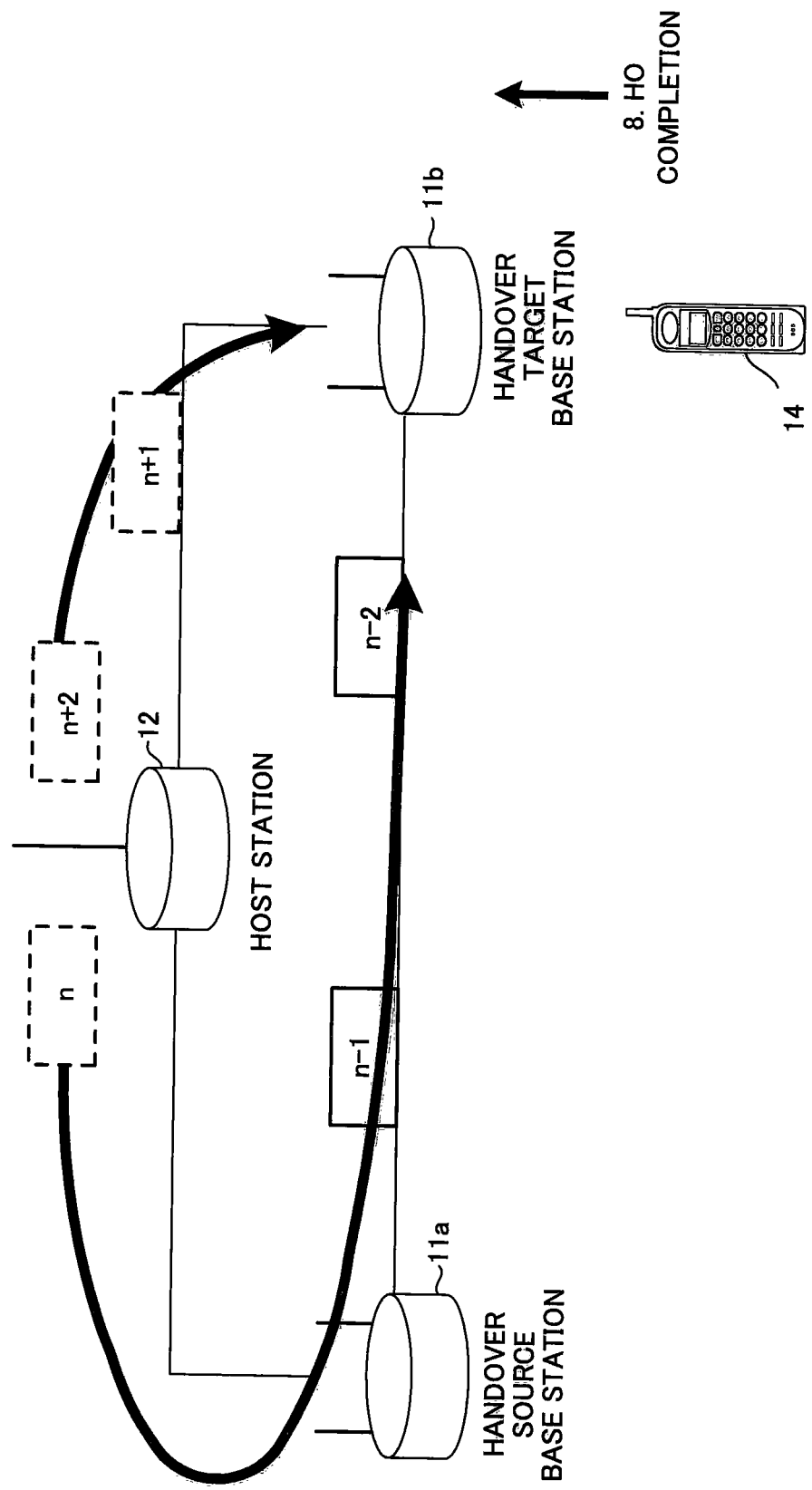
FIG. 17 is a diagram depicting a fourth embodiment.

In the above embodiments, the PDCP layer is installed in aGW 12, which is a host station, and the RLC layer and lower layer are installed in the base station 11 as shown in (A) of FIG. 16, but as (B) of FIG. 16 shows, a system may be constructed such that the entire PDCP layer, RLC layer and lower layer are installed in the base station 11, and only simple functions, such as packet routing function, may be installed in aGW 12. In the system configuration of (B) of FIG. 16, a sequence number attaching function may be provided to the base station. FIG. 17 is a diagram depicting forwarding when handover is generated in such a system.

Three packets are sent from a host station 12 to a handover source base station 11a, and packet numbers n−2, n−1 and n are attached in the base station. It is assumed that handover is started in a state when these packets n−2, n−1 and n remain in a buffer without being sent to the mobile station. If these packets n−2, n−1 and n are forwarded during execution of the handover sequence, these packets are transferred from the handover source base station 11a to the handover target base station 11b as shown in FIG. 17. During this forwarding, packets may be sent from the host station 12 to the handover target base station 11b. In such a case, the handover target base station 11b cannot attach correct sequence numbers to the packets received from the host station 12. Therefore when the packets n−2, n−1 and n, which have not been sent to the mobile station, are forwarded to the handover target base station 11b, the handover source base station 11a also forwards the sequence numbers to the handover target base station. In other words, the sequence number n+1 to be attached to the packet, which is sent from the host station 12 to the handover target base station 11b is forwarded. Thereby the control unit 24 of the handover target base station 11b can attach the sequence number n+1 to the packet exactly, even if packets are sent from the host station 12 to the handover target base station 11b during forwarding.

In the case of the fourth embodiment as well, the transference execution information PH0, to indicate whether forwarding was executed or not, can be included in the HO instruction message and sent to the mobile station, whereby reordering processing can be omitted when forwarding is not performed.

Figure 18:
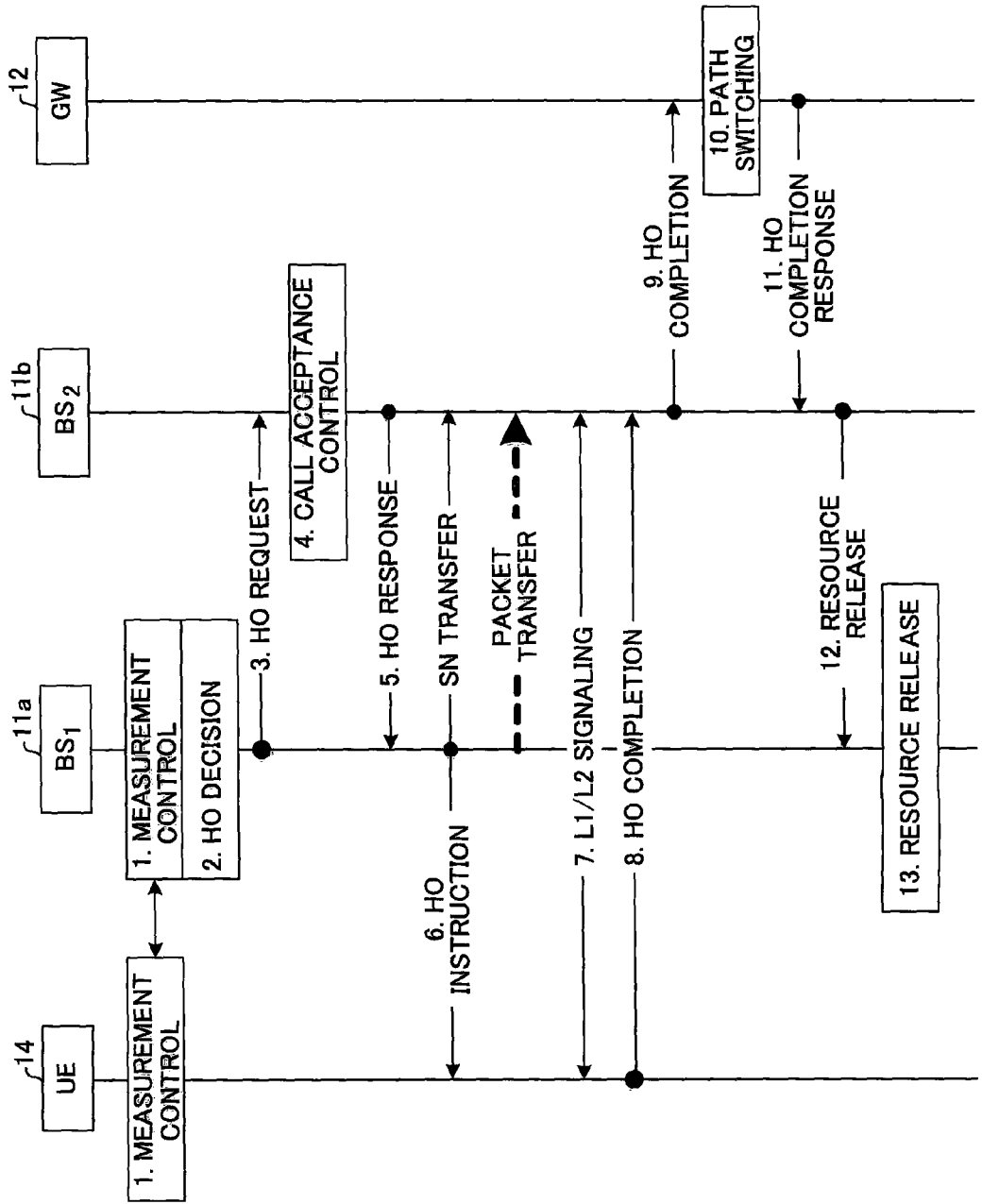
FIG. 18 is a diagram depicting a handover procedure of the fourth embodiment.
Figure 20:
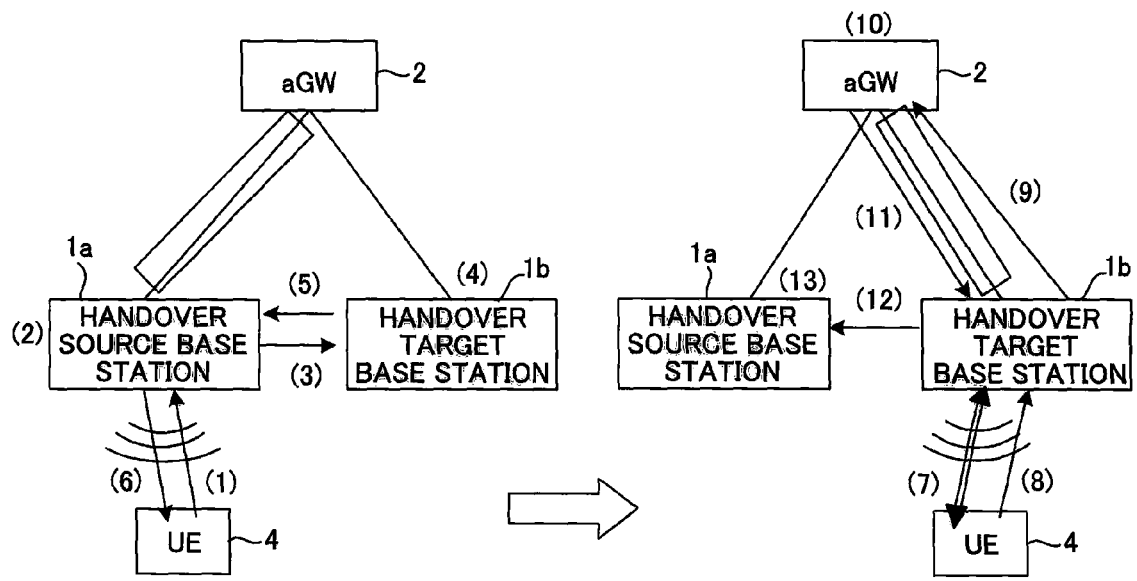
FIG. 20 is a diagram depicting handover of an LTE communication system.
Figure 21:
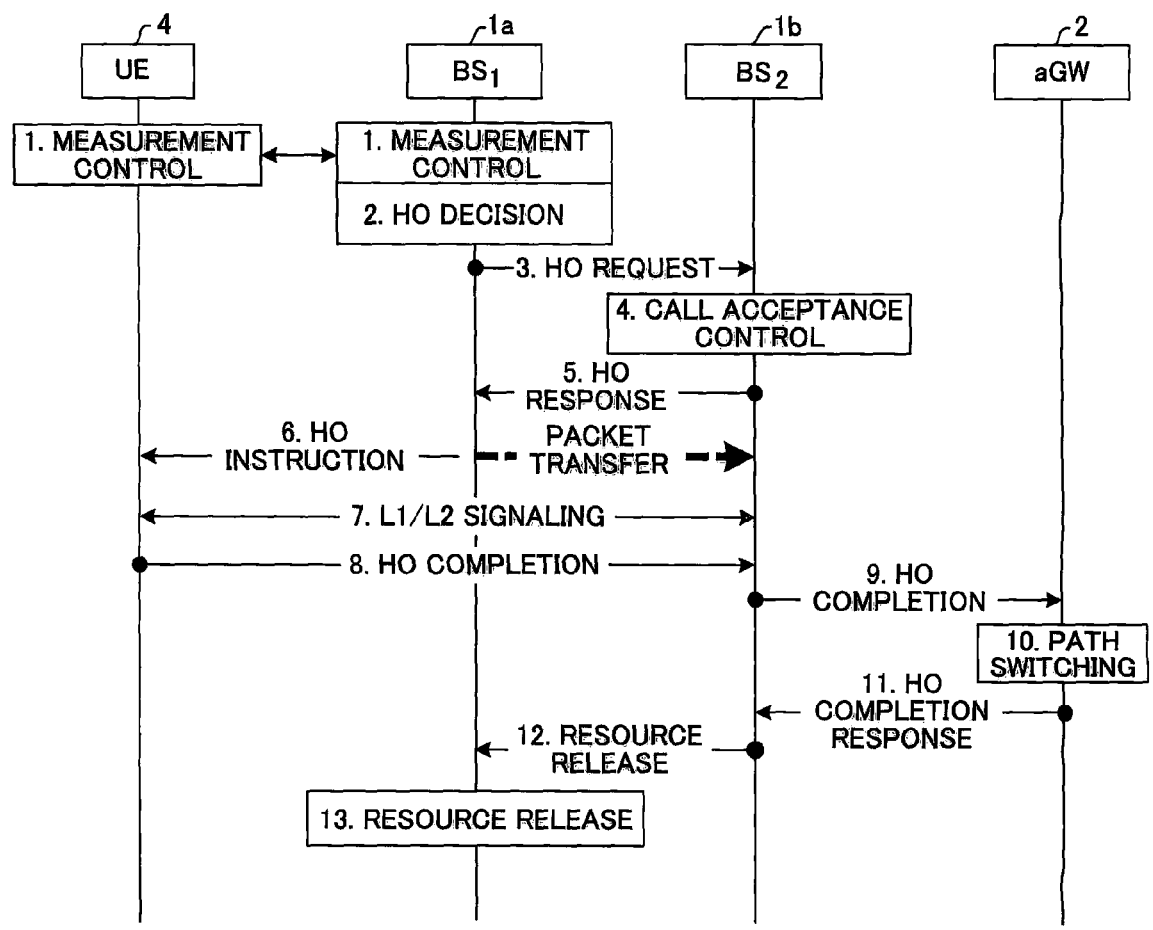
FIG. 21 is a diagram depicting a handover procedure which is currently assumed in the LTE communication system.
Figure 22:
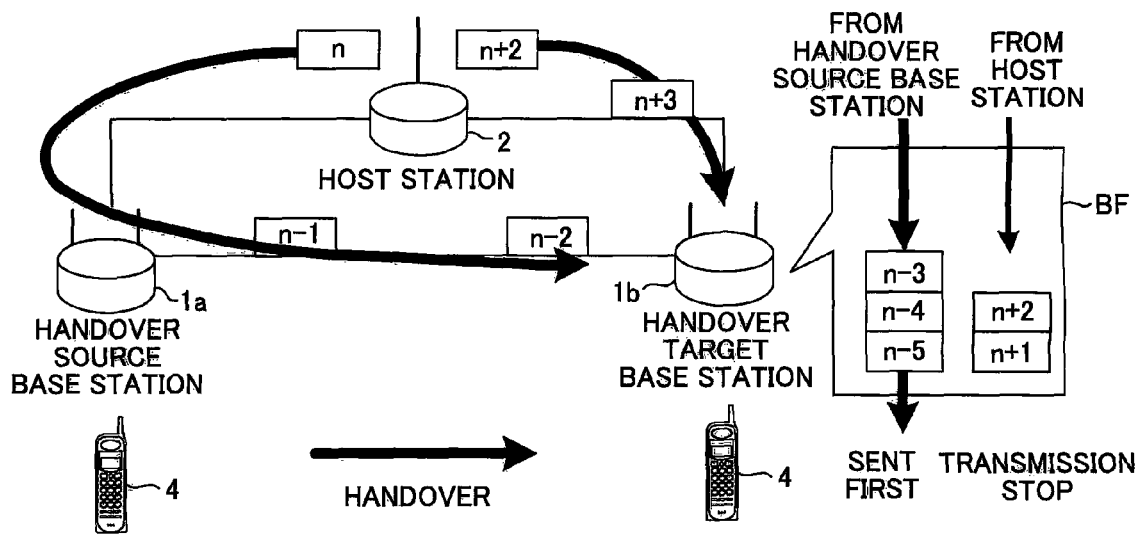
FIG. 22 is a diagram depicting packet sequence matching.
Figure 23:
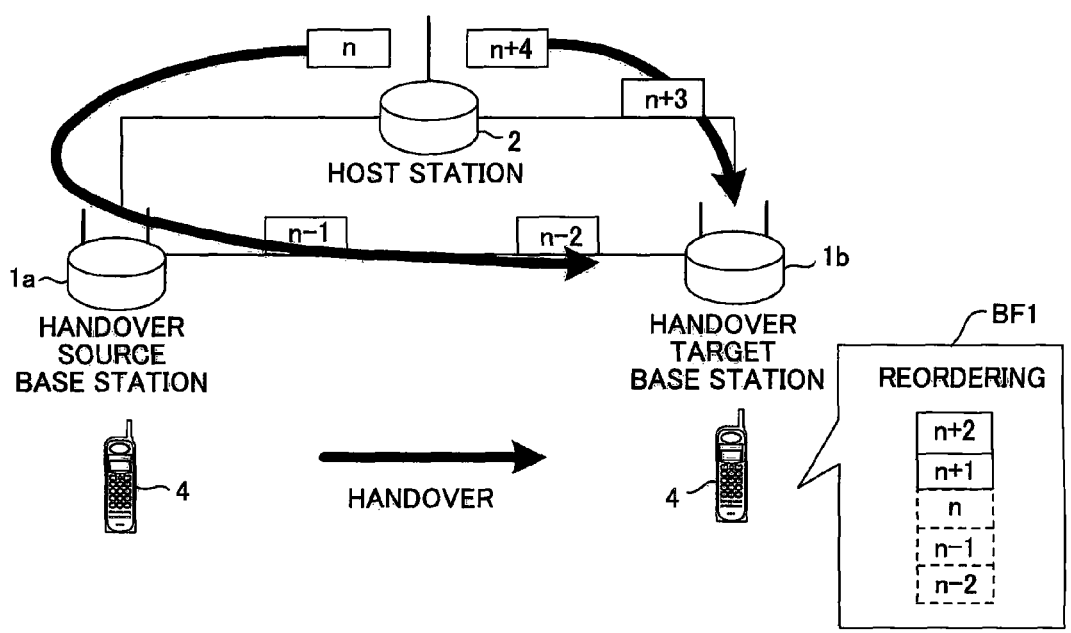
FIG. 23 is a diagram depicting reordering processing of a mobile station.

FIG. 18 is a diagram depicting the handover procedure of the fourth embodiment, in which the same procedures as the diagram depicting the handover procedures in FIG. 21, are denoted with the same numbers. The difference is that the sequence numbers SN are transferred from the handover source base station 11a to the handover target base station 11b before the packet transfer (packet forwarding).

According to the fourth embodiment, sequence numbers are forwarded during handover even if the sequence numbers are assigned to the packets in the handover source base station, so correct sequence numbers can be attached to the packets in the handover target base station, and if forwarding is not executed, reordering processing can be omitted in the mobile station.

Advantage of the Embodiments

According to the present invention, when packets remaining in the handover source base station are not forwarded to the handover target base station (when transference is not executed) at the execution of handover control, the mobile station does not have to execute reordering, even if the sequence numbers are not continuous, so unnecessary wait time is not generated, delay time of data is minimized, and throughput of the entire system can be improved.

Furthermore, according to the present invention, the mobile station does not have to execute reordering, even if the forwarding is not executed depending on the communication state (congested state, buffer empty state, function installed state) and type of communication service, so unnecessary wait time is not generated, delay time of data is minimized, and throughput of the entire system can be improved.

Furthermore, according to the present invention, packets are forwarded during handover even in the case of VoIP calling, so the quality of VoIP can be improved, and delay time due to reordering processing can be decreased in the mobile station by decreasing the duration of reordering processing.

Furthermore, according to the present invention, sequence numbers are forwarded during handover even if the sequence numbers are attached to packets in the handover source base station, so correct sequence numbers can be attached to the packets in the handover target base station, and reordering processing can be omitted in the mobile station if forwarding is not performed.

What is claimed is:

1. A communication system in which a base station sends packets to which numbers indicating sequence are attached, to a mobile station, the mobile station rearranges the packets in order of the sequence number, and hard handover is performed, comprising:
a handover source base station having a controller that decides whether the handover source base station forwards packets which have not been sent to the mobile station, out of packets received from a host station, to a handover target base station or not, controls forwarding of the packets from the handover source base station to the handover target base station at the handover based on the decision, and sends forwarding execution information from the handover source base station to the mobile station to notify whether the forwarding of the packets from the handover source base station to the handover target base station has been executed or not, wherein the mobile station including:
a receiver that receives the forwarding execution information from the handover source base station; and
a controller that executes reordering of the packets received from the handover target base station based on the forwarding execution information at the handover.

2. The communication system according to claim 1, wherein the controller in the handover source base station sends the forwarding execution information to the mobile station, the forwarding execution information being used by the mobile station for determining whether the mobile station should execute reordering of the packets received from the handover target base station.

3. The communication system according to claim 1, wherein in a case where the handover source base station is to forward the packets which have not been sent to the mobile station, to the handover target base station at the handover, the controller in the handover source base station forwards the packets to the handover target base station at the handover and sends the forwarding execution information which notifies that the forwarding of the packets from the handover source base station to the handover target base station has been executed, to the mobile station, and in a case where the handover source base station is not to forward the packets to the handover target base station at the handover, the controller in the handover source base station sends the forwarding execution information which notifies that the forwarding of the packets from the handover source base station to the handover target base station has been not executed, to the mobile station at the handover.

4. The communication system according to claim 1, wherein the controller in the handover source base station decides whether the handover source base station forwards the packets which have not been sent to the mobile station, to the handover target base station at the handover or not, in conformity with the type of communication call.

5. The communication system according to claim 4, wherein the controller in the mobile station controls the reordering of the packets received from the handover target base station based on the forwarding execution information which is set in conformity with the type of the communication call.

6. The communication system according to claim 1, wherein the handover target base station includes a storage unit that stores both packets received from the host station and the packets received from the handover source base station at the handover and a sender that sends the packets stored in the storage unit to the mobile station.

7. The communication system according to claim 6, wherein the handover target base station has a sending controller that sends the packets received from the handover source base station at the handover preferentially and sends the packets received from the host station subsequently.

8. The communication system according to claim 1, wherein the controller in the mobile station determines at the handover whether the mobile station executes reordering of the packets received from the handover target base station or not, based the forwarding execution information.

9. The communication system according to claim 1, wherein the mobile station has a storage unit that stores the packets received from the handover target base station and the controller in the mobile station controls reordering of the packets stored in the storage unit.

10. The communication system according to claim 1, wherein the controller in the mobile station ends reordering processing when packets having continuous numbers are not received even if reordering processing of the received packets is executed for a predetermined time.

11. A communication system in which a base station sends packets to which numbers indicating order are attached, to a mobile station, the mobile station performs delivery of the packets in order, and handover is performed, comprising:
   a handover source base station provided with a controller that sends configuration information indicating whether forwarding of packets has been executed or not, to the mobile station, wherein
   the mobile station includes:
      a receiver that receives the configuration information indicating whether the forwarding of packets has been executed or not, from the handover source base station; and
      a controller that controls delivery of the packets received from a handover target base station at the handover, in order based on the configuration information indicating whether the forwarding of packets has been executed or not, and wherein
   the controller in the handover source base station decides whether the handover source base station forwards packets which have not been sent to the mobile station, out of packets received from a host station, to the handover target base station or not, controls the forwarding of the packets from the handover source base station to the handover target base station at the handover based on the decision, and controls of sending the configuration information indicating whether forwarding of packets has been executed or not, from the handover source base station to the mobile station.

* * * * *